(12) United States Patent
Wu et al.

(10) Patent No.: US 12,101,779 B2
(45) Date of Patent: Sep. 24, 2024

(54) WIRELESS COMMUNICATION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Zuomin Wu, Guangdong (CN); Yanan Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/329,605

(22) Filed: May 25, 2021

(65) Prior Publication Data

US 2021/0282171 A1 Sep. 9, 2021

Related U.S. Application Data

(63) Continuation of application No. PCT/CN2018/124972, filed on Dec. 28, 2018.

(51) Int. Cl.
*H04W 72/23* (2023.01)
*H04L 1/1867* (2023.01)
(Continued)

(52) U.S. Cl.
CPC ........... *H04W 72/23* (2023.01); *H04L 1/1887* (2013.01); *H04W 72/1268* (2013.01); *H04W 72/569* (2023.01)

(58) Field of Classification Search
CPC ......... H04W 72/1289; H04W 72/1242; H04W 72/1268; H04L 1/1887
See application file for complete search history.

(56) References Cited

U.S. PATENT DOCUMENTS

2016/0212734 A1   7/2016 He et al.
2020/0044791 A1*  2/2020 Tsai ................. H04W 72/0413
(Continued)

FOREIGN PATENT DOCUMENTS

CN   106162897 A   11/2016
CN   107733587 A    2/2018
(Continued)

OTHER PUBLICATIONS

International Search Report issued Sep. 18, 2019 of PCT/CN2018/124972 (4 pages).
(Continued)

*Primary Examiner* — Kevin M Cunningham
(74) *Attorney, Agent, or Firm* — Perkins Coie LLP

(57) ABSTRACT

Implementations of the present application provided a wireless communication method, a terminal device, and a network device, for use in improving the flexibility of downlink control information (DCI). The method comprises: executing a transmitting operation of a first feedback sequence on a first uplink resource, wherein the first feedback sequence
(Continued)

comprises feedback information corresponding to at least one first DCI; the feedback information corresponding to the first DCI reflects the reception condition of a data channel scheduled by the first DCI or the reception condition of the first DCI; the resource position of the first uplink resource is obtained by the approach other than the approach of obtaining from the first DCI.

18 Claims, 5 Drawing Sheets

(51) Int. Cl.
 *H04W 72/1268* (2023.01)
 *H04W 72/566* (2023.01)

(56) References Cited

U.S. PATENT DOCUMENTS

| | | | | |
|---|---|---|---|---|
| 2020/0106569 | A1* | 4/2020 | Tsai | H04L 1/1854 |
| 2021/0160919 | A1* | 5/2021 | Wang | H04W 74/002 |
| 2021/0167900 | A1* | 6/2021 | Karaki | H04W 72/23 |
| 2021/0184803 | A1* | 6/2021 | Ge | H04L 1/1887 |

FOREIGN PATENT DOCUMENTS

| | | |
|---|---|---|
| CN | 107919948 A | 4/2018 |
| CN | 108886832 A | 11/2018 |
| EP | 2922352 | 9/2015 |
| JP | 2013516886 A | 5/2013 |
| WO | 2015080140 A1 | 6/2015 |
| WO | 2016060242 A1 | 4/2016 |
| WO | 2017033780 A1 | 3/2017 |
| WO | 2017138853 A1 | 8/2017 |
| WO | 2018128439 A1 | 7/2018 |
| WO | 2018128493 A1 | 7/2018 |

OTHER PUBLICATIONS

Extended European Search Report for European Application No. 18944274.2 issued Oct. 18, 2021. 10 pages.
NTT Docomo, Inc. "Resource allocation for PUCCH" R1-1807065; 3GPP TSF RAN WG1 Meeting #93; Busan, Korea, May 21-25, 2018. 8 pages.
Office Action of the Indian application No. 202117029113, issued on Mar. 1, 2022. 10 pages with English Translation.
Examination Report for European Application No. 18944274.2 issued Jul. 4, 2022. 5 pages.
Notice of Reasons for Refusal for Japanese Application No. 2021-535215 issued Jun. 3, 2022. 20 pages with English translation.
Examination Report for Canadian Application No. 3123691 issued Sep. 9, 2022. 5 pages.
First Office Action for Chinese Application No. 2021108115889 issued Sep. 22, 2022. 14 pages with English translation.
Huawei et al. "Feature lead summary of HARQ enhancement in NR-U" R1-1814146; 3GPP TSG RAN WG1 Meeting #95; Spokane, USA; Nov. 12-16, 2018. 15 pages.
New Postcom "Remaining issues on uplink control signaling" R1-123350; 3GPP TSG RAN WG1 Meeting #70; Qingdao, China; Aug. 13-17, 2012. 6 pages.
Samsung "Group DCI for uplink HARQ-ACK feedback" R1-1801926; 3GPP TSG RAN WG1 Meeting #92; Athens, Greece; Feb. 26-Mar. 2, 2018. 8 pages.
Hearing notice of Indian application No. 202117029113 issued on Mar. 22, 2024, 3 pages.

\* cited by examiner

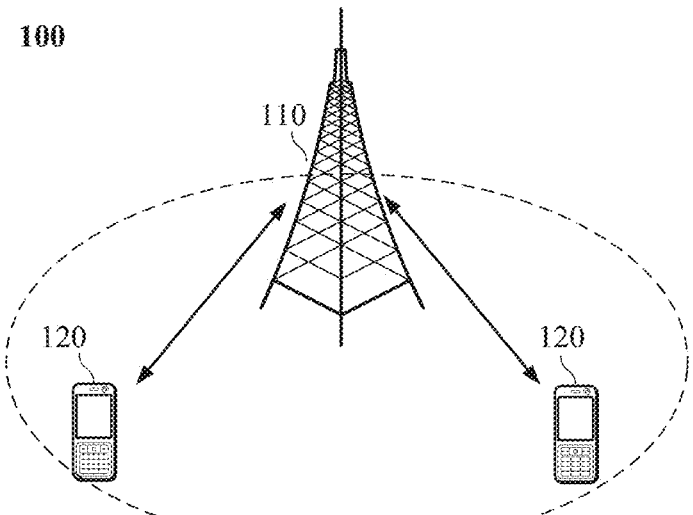

FIG. 1

200 a terminal device performs a sending operation of a first feedback sequence on a first uplink resource, wherein the first feedback sequence includes feedback information corresponding to at least one piece of first Downlink Control Information (DCI), the feedback information corresponding to the first DCI reflects a reception situation of a data channel scheduled by the first DCI or a reception situation of the first DCI, and a resource location of the first uplink resource is acquired in a manner other than acquiring from the first DCI — 210

FIG. 2

300 a network device performs a receiving operation of a first feedback sequence on a first uplink resource, wherein the first feedback sequence includes feedback information corresponding to at least one piece of first Downlink Control Information (DCI), The feedback information corresponding to the first DCI reflects a reception situation of a data channel scheduled by the first DCI or a reception situation of the first DCI, and a resource location of the first uplink resource is acquired by the terminal device in a way other than acquiring from the first DCI — 310

FIG. 3

WIRELESS COMMUNICATION METHOD, TERMINAL DEVICE, AND NETWORK DEVICE

CROSS-REFERENCE TO RELATED APPLICATIONS

The present application is a continuation application of International PCT Application No. PCT/CN2018/124972, having an international filing date of Dec. 28, 2018. The content of the above-identified application is hereby incorporated by reference.

TECHNICAL FIELD

Implementations of the present application relate to the field of communication technologies, and more particularly to a wireless communication method, a terminal device, and a network device.

BACKGROUND

In a New Radio (NR) system, a terminal device may be scheduled by Downlink Control Information (DCI), and the terminal device may transmit data based on scheduling of the DCI. The terminal device can feed back the DCI or scheduled data. Herein, the DCI further indicates information such as a resource that the terminal device feeds back.

The NR system has a high requirement on flexibility of signaling, so how to improve flexibility of the DCI is a problem to be solved urgently.

SUMMARY

Implementations of the present application provide a wireless communication method, a terminal device and a network device, which can improve flexibility of DCI.

In a first aspect, a wireless communication method is provided, including: performing a sending operation of a first feedback sequence on a first uplink resource, herein the first feedback sequence includes feedback information corresponding to at least one piece of first Downlink Control Information (DCI), the feedback information corresponding to the first DCI reflects a reception situation of a data channel scheduled by the first DCI or a reception situation of the first DCI, and a resource location of the first uplink resource is acquired in a manner other than acquiring from the first DCI.

In a second aspect, a wireless communication method is provided, including: performing a receiving operation of a first feedback sequence on a first uplink resource, wherein the first feedback sequence includes feedback information corresponding to at least one piece of first Downlink Control Information (DCI), the feedback information corresponding to the first DCI reflects a reception situation of a data channel scheduled by the first DCI or a reception situation of the first DCI, and a resource location of the first uplink resource is acquired in a manner other than acquiring from the first DCI.

In a third aspect, a terminal device is provided, which is configured to perform the method in the above first aspect.

Specifically, the terminal device includes function modules for performing the method in the above first aspect.

In a fourth aspect, a network device is provided, which is configured to perform the method in the above second aspect.

Specifically, the network device includes function modules for performing the method in the above second aspect.

In a fifth aspect, a terminal device is provided, including a processor and a memory. The memory is configured to store a computer program, and the processor is configured to call and run the computer program stored in the memory to perform the method in the above first aspect.

In a sixth aspect, a network device is provided, including a processor and a memory. The memory is configured to store a computer program, and the processor is configured to call and run the computer program stored in the memory to perform the method in the above second aspect.

In a seventh aspect, a chip is provided, which is configured to implement the method in the above first aspect.

Specifically, the chip includes a processor, configured to call and run a computer program from a memory to enable a device disposed with the chip to perform the method in the above first aspect.

In an eighth aspect, a chip is provided, which is configured to implement the method in the above second aspect.

Specifically, the chip includes a processor, configured to call and run a computer program from a memory to enable a device disposed with the chip to perform the method in the above second aspect.

In a ninth aspect, a computer readable storage medium is provided, configured to store a computer program, and the computer program enables a computer to perform the method in the above first aspect.

In a tenth aspect, a computer readable storage medium is provided, configured to store a computer program, and the computer program enables a computer to perform the method in the above second aspect.

In an eleventh aspect, a computer program product is provided, including computer program instructions, and the computer program instructions enable a computer to perform the method in the above first aspect.

In an twelfth aspect, a computer program product is provided, including computer program instructions, and the computer program instructions enable a computer to perform the method in the above second aspect.

In a thirteenth aspect, a computer program is provided, which, when run on a computer, enables the computer to perform the method in the above first aspect.

In a fourteenth aspect, a computer program is provided, which, when run on a computer, enables the computer to perform the method in the above second aspect.

Therefore, in implementations of the present application, a resource location of uplink resource used for sending feedback information corresponding to DCI may be acquired in a manner other than acquiring from the first DCI. Information field indicating the resource location in the first DCI may be used for other functions, so that the flexibility of the DCI may be improved, furthermore, the resource location of the uplink resource may be acquired in other manners, so that the flexibility of resource location indication may be further improved.

BRIEF DESCRIPTION OF DRAWINGS

FIG. 1 is a schematic diagram of an architecture of a communication system according to an implementation of the present application.

FIG. 2 is a schematic diagram of a wireless communication method according to an implementation of the present application.

FIG. 3 is a schematic diagram of a wireless communication method according to an implementation of the present application.

DETAILED DESCRIPTION

Figure 4:
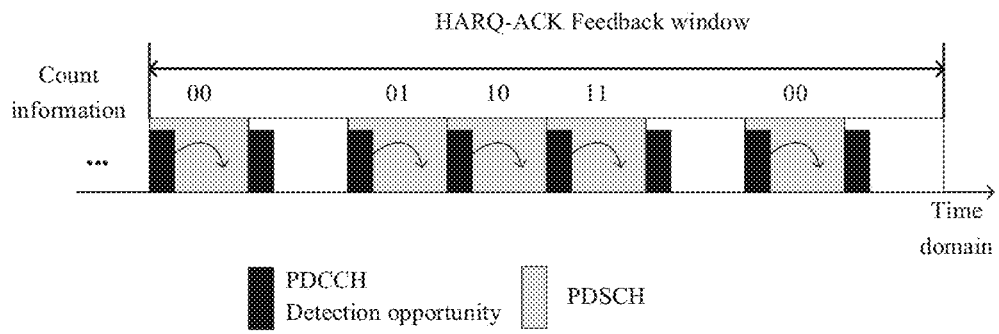
FIG. 4 is a schematic diagram of a HARQ-ACK feedback window according to an implementation of the present application.

Technical solutions in implementations of the present application will be described below with reference to the drawings in the implementations of the present application. It is apparent that the implementations described are just some of the implementations of the present application, but not all of the implementations of the present application. According to the implementations of the present application, all other implementations achieved by a person of ordinary skill in the art without making inventive efforts are within the protection scope of the present application.

The technical solutions of the implementation of the present application may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD) system, an Advanced long term evolution (LTE-A) system, a New Radio (NR) system, an evolution system of the NR system, an LTE-based access to unlicensed spectrum (LTE-U) system, an NR-based access to unlicensed spectrum (NR-U) system, a Universal Mobile Telecommunication System (UMTS), a Worldwide Interoperability for Microwave Access (WiMAX) communication system, Wireless Local Area Networks (WLAN), Wireless Fidelity (WiFi), a next generation communication system or another communication system, etc.

Generally speaking, a traditional communication system supports a limited number of connections and is easy to be implemented. However, with a development of communication technology, a mobile communication system will not only support traditional communication, but also support, for example, Device to Device (D2D) communication, Machine to Machine (M2M) communication, Machine Type Communication (MTC), and Vehicle to Vehicle (V2V) communication. Implementations of the present application may also be applied to these communication systems.

Illustratively, a communication system 100 applied in an implementation of the present application is shown in FIG. 1. The communication system 100 may include a network device 110, and the network device 110 may be a device that communicates with a terminal device 120 (or referred to as a communication terminal, or a terminal). The network device 110 may provide communication coverage for a specific geographical area, and may communicate with terminal devices located within the coverage area. Optionally, the network device 110 may be a Base Transceiver Station (BTS) in a GSM system or CDMA system, or a NodeB (NB) in a WCDMA system, or an Evolutional Node B (eNB or eNodeB) in an LTE system, or a radio controller in a Cloud Radio Access Network (CRAN), or the network device may be a mobile switching center, a relay station, an access point, a vehicle-mounted device, a wearable device, a hub, a switch, a bridge, a router, a network side device in a 5G network, or a network device in a future evolved Public Land Mobile Network (PLMN), etc.

The communication system 100 further includes at least one terminal device 120 located within the coverage area of the network device 110. The "terminal device" as used herein includes, but not limited to, a device configured to receive/send communication signals via a wired circuit, for example, via a public switched telephone network (PSTN), a digital subscriber line (DSL), a digital cable, a direct cable; and/or via another data connection/network; and/or via a wireless interface, for instance, for a cellular network, a wireless local area network (WLAN), a digital television network such as a digital video broadcasting-handheld (DVB-H) network, a satellite network, and an amplitude modulation-frequency modulation (AM-FM) broadcast transmitter; and/or another terminal device; and/or an Internet of Things (IoT) device. A terminal device configured to communicate via a wireless interface may be referred to as "a wireless communication terminal", "a wireless terminal" or "a mobile terminal". Examples of the mobile terminal include, but not limited to, a satellite or cellular telephone; a Personal Communication System (PCS) terminal that can be combined with a cellular wireless telephone a data processing, faxing, and data communication abilities; a Personal Digital Assistant (PDA) that may include a radio telephone, a pager, an internet/intranet access, a Web browser, a memo pad, a calendar, a Global Positioning System (GPS) receiver; and a conventional laptop and/or palmtop receiver or another electronic apparatus including a radio telephone transceiver. The terminal device may be refer to an access terminal, user equipment (UE), a subscriber unit, a subscriber station, a mobile station, a rover platform, a remote station, a remote terminal, a mobile device, a user terminal, a terminal, a wireless communication device, a user agent, or a user device. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing devices connected to a wireless modem, a vehicle-mounted device, a wearable device, a terminal device in a 5G network, or a terminal device in a future evolved Public Land Mobile Network (PLMN), or the like.

Optionally, Device to Device (D2D) communication may be performed between the terminal devices 120.

Optionally, the 5G system or 5G network may be referred to as a new radio (NR) system or a NR network.

FIG. 1 exemplifies one network device and two terminal devices. Optionally, the wireless communication system 100 may include multiple network devices, and another quantity of terminal devices may be included within a coverage area of each network device, which is not limited in the implementations of the present application.

Optionally, the communication system 100 may include other network entities, such as a network controller and a mobile management entity, which is not limited in the implementations of the present application.

It should be understood that a device with a communication function in a network/system in the implementations of the present application may be referred to as a communication device. Taking the communication system 100 shown in FIG. 1 as an example, the communication device may include a network device 110 and a terminal device 120 which have communication functions, and the network device 110 and the terminal device 120 may be the specific devices described above, and will not be described herein again. The communication device may also include other devices in the communication system 100, such as a network controller, a mobile management entity, and other network entity, which is not limited in the implementations of the present application.

It should be understood that the terms "system" and "network" are often used interchangeably in this document. The term "and/or" in this document is merely an association relationship describing associated objects, indicating that there may be three relationships, for example, A and/or B may indicate three cases: A alone, A and B, and B alone. In addition, the symbol "/" in this document generally indicates that objects before and after the symbol "/" have an "or" relationship.

Implementations of the present application may be applied to communication of an unlicensed spectrum.

An unlicensed spectrum, also referred to as unauthorized spectrum, is a spectrum divided by countries and regions that may be used for communication of radio devices. This spectrum may be considered as a shared spectrum, that is, communication devices in different communication systems can use this spectrum as long as they meet the regulatory requirements set by a country or a region on this spectrum, without applying for an exclusive spectrum authorization from the government. In order to make all communication systems that use unlicensed spectrum for wireless communication coexist amicably on this spectrum, the communication device can follow the principle of Listen Before Talk (LBT) when communicating on the unlicensed spectrum, that is, the communication device needs to perform channel listening (or called as channel detection) before transmitting signals on the unlicensed spectrum, and only when a result of channel listening is that the channel is idle, can the communication device transmit signals. If the result of channel listening by the communication device on the unlicensed spectrum is that the channel is busy, the signal cannot be transmitted. In addition, in order to ensure fairness, in one transmission, a duration of signal transmission by the communication device using the unlicensed spectrum channel may not exceed a Maximum Channel Occupation Time (MCOT).

With the development of wireless communication technologies, a NR system can be deployed on an unlicensed spectrum for performing transmission of data services using the unlicensed spectrum.

It should be understood that the implementations of the present application may be applied not only to scenarios of unlicensed spectrums, but also to scenarios of licensed spectrums.

FIG. 2 is a schematic flowchart of a wireless communication method 200 according to an implementation of the present application. The method 200 includes at least part of the following contents.

In act 210, a terminal device performs a sending operation of a first feedback sequence on a first uplink resource, wherein the first feedback sequence includes feedback information corresponding to at least one piece of first Downlink Control Information (DCI). The feedback information corresponding to the first DCI reflects a reception situation of a data channel scheduled by the first DCI or a reception situation of the first DCI, and a resource location of the first uplink resource is acquired in a manner other than acquiring from the first DCI.

In a scenario where the method 200 is used for an unlicensed spectrum, optionally, the sending operation of the first feedback sequence performed by the terminal device may include an LBT operation performed on the channel, wherein the first feedback sequence can be sent if the LBT operation is successful, or cannot be sent if the LBT operation is not successful.

FIG. 3 is a schematic flowchart of a wireless communication method 300 according to an implementation of the present application. The method 300 includes at least part of the following contents.

In act 310, a network device performs a receiving operation of a first feedback sequence on a first uplink resource, wherein the first feedback sequence includes feedback information corresponding to at least one piece of first DCI. The feedback information corresponding to the first DCI reflects a reception situation of a data channel scheduled by the first DCI or a reception situation of the first DCI, and a resource location of the first uplink resource is acquired by the terminal device in a way other than acquiring from the first DCI.

In a scenario where the method 300 is used for an unlicensed spectrum, the receiving operation of the first feedback sequence by the network device may include detecting the first feedback sequence. If the terminal device does not send the first feedback sequence, the network device will not detect the first feedback sequence.

A specific implementation mode of an implementation of the present application will be described below, and the following implementation mode is applicable to the method 200 and the method 300.

The first DCI in an implementation of the present application may be referred to as DCI that does not indicate an effective feedback resource (a feedback resource in implementations of the present application refers to a resources used for sending feedback information) or DCI that indicates an invalid feedback resource, for example, Hybrid Automatic Repeat Request (HARQ) timing indication information in the DCI does not indicate a time domain location of the feedback resource. Second DCI mentioned below may be referred to as DCI indicating an effective feedback resource, for example, HARQ timing indication information (PDSCH-to-HARQ_feedback timing indicator field) in the DCI indicates the time domain location of the feedback resource. Herein, when the first DCI does not indicate an effective feedback resource, it may be understood that the feedback resource corresponding to the first DCI is provisional, or a feedback will be performed in a later stage.

Optionally, in an implementation of the present application, the uplink resource (such as the first uplink resource, a second uplink resource or a third uplink resource) used for sending the feedback sequence may be a Physical Uplink Control Channel (PUCCH) resource or a Physical Uplink Shared Channel (PUSCH) resource.

Optionally, the feedback sequence in an implementation of the present application may include feedback information corresponding to the at least one piece of DCI, and the feedback information corresponding to each DCI may include feedback information corresponding to a Physical Downlink Shared Channel (PDSCH) scheduled by the DCI, for example, feedback information corresponding to one PDSCH. Feedback information corresponding to each PDSCH may include one HARQ feedback bit group, wherein each feedback bit group may include at least one feedback bit, and each feedback bit is used for carrying NACK or ACK.

Generally, one PDSCH may transmit two Transmit Blocks (TBs) (or referred to as two CodeWords (CWs)) at the maximum, wherein one TB may include one or more Coding Block Groups (CBGs). One CW or one CBG may correspond to one bit of HARQ-ACK feedback information, therefore, one PDSCH may correspond to one HARQ feedback bit group. The size of the HARQ feedback bit group may be configured by a higher layer. For example, in a case that CBG-based feedback is supported, if the higher layer configures a PDSCH to transmit a maximum of 2 TBs (i.e., 2 CWs), and each TB may include N CBGs at the maximum, then one HARQ feedback bit group includes K=2*N HARQ-ACK feedback bits, and the order of the feedback bits may be {CW0 CBG0, CW0 CBG1, CW0 CBG2, . . . . CW0 CBG N−1, CW1 CBG0, CW1 CBG1, CW1 CBG2, . . . , CW1 CBG N−1}. For another example, in a case that the CBG-based feedback is not supported, if the higher layer configures a PDSCH to transmit a maximum of 2 TB (i.e., 2 CWs), then one HARQ feedback bit group includes K=2 HARQ-ACK feedback bits. For another example, in a case that the CBG-based feedback is not supported, if the higher layer configures a PDSCH to transmit a maximum of 1 TB (i.e., 1 CW), then one HARQ feedback bit group includes K=1 HARQ-ACKnowledge (ACK) feedback bit. Non-corresponding feedback information in the feedback bit group is set as Negative ACKnowledgment (NACK). For example, if the PDSCH only includes CW0 during an actual transmission, all feedback bits corresponding to CW1 are NACK. The feedback information corresponding to at least one PDSCH may be jointly transmitted, so as to form a feedback sequence in the present application.

Optionally, in an implementation of the present application, the first uplink resource acquired by the terminal device in a manner other than acquiring from the first DCI may be at least one of a time domain resource, a frequency domain resource and a code domain resource.

For example, the time domain location of the first uplink resource may be acquired in a manner other than acquiring from the first DCI, and the frequency domain location and/or code domain location of the first uplink resource may be acquired by the first DCI.

For example, the time domain location, the frequency domain location and the code domain location of the first uplink resource may all be acquired in a manner other than acquiring from the first DCI.

For example, the frequency domain location and/or the code domain location of the first uplink resource may be acquired in a manner other than acquiring from the first DCI, while the time domain location of the first uplink resource may be acquired by the first DCI.

Optionally, in an implementation of the present application, the resource location of the first uplink resource may be indicated by a first trigger signaling other than the first DCI. Herein, the first trigger signaling mentioned here may be DCI.

Specifically, the first trigger signaling may have at least one information field, and the at least one information field may indicate the resource location of the first uplink resource. For example, the first trigger signaling may indicate the time domain location of the first uplink resource, which may optionally refer to a time slot occupied by the first feedback sequence.

For example, the first trigger signaling may indicate a distance between a time slot occupied by the first uplink resource and a time slot occupied by the first trigger signaling, or, the first trigger signaling may also indicate a difference between the time slot occupied by the first uplink resource and a time slot occupied by one of the at least one piece of first DCI (for example, the first one or the last one of the at least one piece of first DCI), or, the first trigger signaling may also indicate a difference between the time slot occupied by the first uplink resource and a time slot occupied by a specific data channel (e.g., the first data channel or the last data channel) among the data channels scheduled by the at least one piece of first DCI, or, the first trigger signaling may also indicate a difference between the time slot occupied by the first uplink resource and a specific time slot (e.g., the last time slot in the transmission opportunity where the at least one piece of first DCI is located or the last time slot in a transmission opportunity subsequent to the transmission opportunity where the at least one piece of first DCI is located).

Of course, the resource location of the first uplink resource may also be acquired in a manner other than that indicated by the first trigger signaling. For example, the resource location of the first uplink resource may be determined by the terminal device according to a preset rule.

Optionally, in an implementation of the present application, the first trigger signaling further includes first information, wherein the first information is used for indicating that the feedback sequence transmitted on the first uplink resource includes feedback information corresponding to the at least one piece of first DCI.

Specifically, in addition to indicating the resource location of the first uplink resource, the first trigger signaling may further indicate, through the first information included in the first trigger signaling, feedback information corresponding to which pieces of DCI is transmitted on the first uplink resource, or feedback information corresponding to which data channels (wherein the data channels may be scheduled by the at least one piece of first DCI) is transmitted on the first uplink resource.

Optionally, the first information mentioned above may include information of a first group; herein the first group is a channel group where the at least one piece of first DCI or the data channel scheduled by the at least one piece of first DCI is located, or the first group is a resource group occupied by the at least one piece of first DCI or the data channel scheduled by the at least one piece of first DCI.

Herein, the group mentioned above may be a channel group where the DCI or a data channel scheduled by the DCI is located, or the group mentioned above may be a downlink resource group occupied by the DCI or the data channel scheduled by the DCI.

That is, the group may be allocated based on the DCI or the data channel scheduled by the DCI, or the group may be allocated based on the downlink resource occupied by the DCI or the data channel scheduled by the DCI.

For example, the terminal device has received five pieces of DCI, which are DCI 1, DCI 2, DCI 3, DCI 4 and DCI 5 respectively. Downlink resources occupied by DCI 1, DCI 2 and DCI 4 form downlink resource group 1, while downlink resources occupied by DCI 3 and DCI 5 form downlink resource group 2. At this time, the five pieces of DCI may be divided into two groups based on downlink resources, wherein DCI 1, DCI 2 and DCI 4 belong to the resource group 1, and DCI 3 and DCI 5 belong to the resource group 2. The network device may carry an identifier of the resource group 2 in the first trigger signaling, so that the terminal device may send feedback information corresponding to DCI3 and DCI5 which are sent in the resource group 2 on the first uplink resource.

Optionally, in an implementation of the present application, in order that the terminal device can identify the channel group or the resource group to which the DCI belongs, when sending each DCI, the DCI may carry a group identifier. For example, still taking the above examples as an example, each of DCI1, DCI2 and DCI4 may carry the identifier of the resource group 1 to which it belongs, and each of DCI3 and DCI5 may carry the identifier of the resource group 2 to which it belongs.

In addition to carrying the identifier of the channel groups or resource groups to which the at least one piece of first DCI belongs in the first trigger signaling, other manners may also be used for indicating that the feedback information of the at least one piece of first DCI is triggered by the first trigger signaling.

Specifically, the first trigger signaling is used for indicating a time range of the DCI corresponding to feedback information that needs to be sent on the first uplink resource. Specifically, the first trigger signaling indicates a time unit closest to the first trigger signaling and/or a time unit farthest from the first trigger signaling. For example, the first trigger signaling indicates a time unit where the DCI closest to the first trigger signaling is located and/or a time unit where the DCI farthest from the first trigger signaling is located (for example, the time unit may be a time slot). Optionally, the time unit where the DCI is located refers to a time unit that may be used for transmitting the DCI, or a PDCCH detection opportunity, which does not mean that DCI will certainly be transmitted on this time unit.

For example, if the time unit occupied by the first trigger signaling is the Pth time unit, it may indicate that the time unit of the DCI closest to the first trigger signaling is the second previous time unit, while the time unit of the DCI farthest from the first trigger signaling is the tenth previous time unit, so the time range is from the (P−10)th time unit to the (P−2)th time unit.

Or, the first trigger signaling is used for indicating a time range of a data channel corresponding to feedback information that needs to be sent on the first uplink resource. Specifically, the first trigger signaling indicates a time unit closest to the first trigger signaling and/or a time unit farthest from the first trigger signaling. For example, the first trigger signaling indicates a time unit where a data channel closest to the first trigger signaling is located and/or a time unit where a data channel farthest from the first trigger signaling is located. Optionally, the time unit where the data channel is located refers to the time unit that may be used for transmitting the data channel, or a PDSCH transmission opportunity, which does not mean that there will certainly be PDSCH transmission on this time unit.

For example, if the time unit occupied by the first trigger signaling is the Pth time unit, it may indicate that the time unit of the data channel closest to the first trigger signaling is the second previous time unit, while the time unit of the data channel farthest from the first trigger signaling is the tenth previous time unit, so the time range is from the (P−10)th time unit to the (P−2)th time unit.

If only the first DCI or the data channel scheduled by the first DCI exists in the above-mentioned time range, only the feedback information corresponding to the first DCI may be sent on the first uplink resource. If there are other DCI (for example, the second DCI mentioned below (indicating the resource location of the corresponding feedback information)), only the feedback information corresponding to the first DCI may be sent on the first uplink resource, or feedback information corresponding to the first DCI and other DCI may be sent as well, which is specifically indicated and determined by the first trigger signaling. For example, if the first trigger signaling carries information of the channel group or resource group to which the first DCI belongs, the feedback information corresponding to the first DCI is sent on the first uplink resource. If the first trigger signaling carries information of the channel group or resource group to which the first DCI belongs and information of the channel group or resource group to which the second DCI belongs, the feedback information corresponding to the first DCI and the second DCI is sent on the first uplink resource.

Optionally, count information in an implementation of the present application may be a Downlink assignment index (DAI). Specifically, the downlink assignment index includes at least one of counter DAI information or total DAI information. In an implementation of the present application, a single piece of the first DCI may include first count information, wherein the first count information may include at least one of the following (1) or (2).

(1) count information 1, that is, a ranking of the single piece of the first DCI being sent at present or the data channel scheduled by the single piece of the first DCI among the first DCI already sent or the data channels scheduled by the first DCI already sent, wherein the ranking may be based on an order of DCI detection opportunities (or an order of PDCCH detection opportunities) or an order of data channel transmission opportunities.

The first DCI already sent may refer to first DCI already sent within a certain range, for example, first DCI whose corresponding feedback information has not been sent. At this time, the first count information may indicate a ranking of the current first DCI in the at least one piece of first DCI, wherein the at least one first DCI may be the first DCI whose corresponding feedback information has not been sent, or, the first count information indicates a ranking of the data channel corresponding to the current first DCI in the at least one data channel scheduled by the first DCI whose corresponding feedback information has not been sent.

Or, the first DCI already sent may be the first DCI within a specific time range, or the data channels scheduled by the first DCI already sent may be the data channels within a specific time range, wherein the specific time range may be the time range indicated by the first trigger signaling. At this time, the first count information may indicate the ranking of the current first DCI in all first DCI already sent included within the time range, or may indicate the ranking of the data channel scheduled by the current first DCI in the data channel scheduled within the time range. The time range in an implementation of the present application may also be referred to as a HARQ-ACK feedback window or a HARQ feedback window.

Herein, the ranking mentioned above may be based on a ranking of an order of detection opportunities, specifically, it may be in the order of frequency domain first and then time domain. In a multi-carrier scenario (carrier 1, carrier 2 and carrier 3), the first time unit sends three pieces of DCI on three carriers, and the three pieces of DCI are ranked by 1, 2 and 3. The second time unit sends three pieces of DCI on three carriers, and the three pieces of DCI are ranked by 4, 5 and 6. The third time unit sends three pieces of DCI, and the three pieces of DCI are ranked by 7, 8 and 9. Optionally, the time unit may be one or more symbols, or may be one time slot, or one subframe. Optionally, the time unit may be determined according to the PDCCH detection opportunities determined by the terminal device.

(2) count information 2, that is, the number of the first DCI already sent at present or the number of data channels scheduled by the first DCI already sent at present.

The first DCI already sent may refer to the first DCI already sent within a certain range, for example, first DCI whose corresponding feedback information has not been sent. At this time, the first count information may indicate the number of the first DCI whose corresponding feedback information has not been sent (which may also be understood as the number of data channels whose feedback information has not be sent).

Or, the first DCI already sent may be the first DCI within a specific time range, or the data channels scheduled by the first DCI already sent may be data channels within a specific time range, wherein the specific time range may be the time range indicated by the first trigger signaling.

At this time, the first count information may indicate how many pieces of the first DCI have been sent in total from a start time unit of the time range to a time unit where the current first DCI is scheduled, or how many data channels have been scheduled in total from the start time unit of the time range to the time unit occupied by the data channel scheduled by the current first DCI.

Taking a multi-carrier scenario as an example, if 3 pieces of DCI are sent in the first time unit, the number indicated by each first DCI in the first time unit is 3, the number indicated by each first DCI in the second time unit is 6, and the number indicated by each first DCI in the third time unit is 9.

Optionally, in an implementation of the present application, the first count information is carried in a first information field in the first DCI, wherein the first information field is for multiplexing a feedback resource indication field.

Specifically, the first DCI may include a feedback resource indicator field (e.g., a PUCCH resource indicator field), which may be originally used for indicating the resource location occupied by feedback information corresponding to the first DCI (e.g., determining a corresponding PUCCH resource from a multiple PUCCH resources configured by a higher layer according to the indication information). If the first DCI is not used for indicating the resource location, the indicator field may be used for indicating the first count information.

Optionally, in an implementation of the present application a feedback codebook of the first feedback sequence may be a dynamic codebook, and specifically, the length of the dynamic codebook may be determined according to the first count information mentioned above, that is, it may be determined according to the actually sent first DCI or the actually scheduled data channel, instead of being preset.

For the convenience of understanding, the following description will be made on manners of determining the dynamic codebook of the first feedback sequence in a single-carrier scenario and a multi-carrier scenario respectively.

Single Carrier Scenario

When a base station sends to a UE a PDCCH (for carrying the first DCI) for scheduling PDSCH, the PDCCH includes first counter DAI information which is used for the UE to determine the HARQ feedback codebook, wherein the first counter DAI information is used for indicating which HARQ feedback bit group in a HARQ feedback window is the HARQ feedback bit group corresponding to the PDSCH currently scheduled by the PDCCH. The first counter DAI information is used for indicating which HARQ feedback bit group in a HARQ-ACK feedback window is the HARQ feedback bit group corresponding to the PDSCH currently scheduled by the PDCCH, which may be understood that the first counter DAI information is used for indicating which one the PDSCH currently scheduled by the PDCCH is among all PDSCHs in a certain time range (HARQ-ACK feedback window). Herein, a ranking mode of the HARQ feedback bit groups may be based on an order of the detection opportunities of PDCCH.

In order to reduce the number of bits of the first count information, a modulo mode may be used for counting. For example, if the number of bits of the first counter DAI information is 2 bits, a value of the counter DAI information is modulo 4, and if the number of bits of the count information is 3 bits, the value of the counter DAI information is modulo 8.

As shown in FIG. 4. A total of eight time slots are included in an HARQ-ACK feedback window, and a PDCCH detection opportunity is configured in each time slot. If a network device schedules a UE to receive PDSCH on the first, third, fourth, fifth and seventh PDCCH detection opportunities among the eight PDCCH detection opportunities. PDCCHs are sent on these five detection opportunities respectively, and the ranking of each PDCCH may be 0, 1, 2, 3 and 4 according to the detection opportunities.

It is assumed that the number of bits of the counter DAI information is 2 bits, and accordingly, bit values of the corresponding count information of the five PDCCH detection opportunities are 00, 01, 10, 11 and 00, respectively.

In the example of FIG. 4, it is assumed that each PDSCH corresponds to two codewords (which are codeword 0 and codeword 1, respectively). After receiving the five PDCCHs, the UE may determine that the size of the codebook corresponding to the PDSCH respectively scheduled by the five PDCCHs in the HARQ-ACK feedback window is 10 bits, as shown in table 1 below. It should be understood that codeword 0 in Table 1 represents feedback information corresponding to codeword 0, for example, the feedback information may be determined as ACK or NACK according to a decoding result of codeword 0 by the UE.

TABLE 1

| DAI count "00" | | DAI count "01" | | DAI count "10" | | DAI count "11" | | DAI count "00" | |
|---|---|---|---|---|---|---|---|---|---|
| Codeword 0 | Codeword 1 | Codeword 0 | Codeword 1 | Codeword 0 | Codeword 1 | Codeword 0 | Codeword 1 | Codeword 0 | Codeword 1 |

If the UE only receives part of the five PDCCHs, for example, the UE does not receive the PDCCH with the DAI count "01", in this case, the UE receives the PDCCH with the DAI count "10" after receiving the PDCCH with the DAI count "00", so it may determine that it has lost the PDCCH with the DAI count "01", so a NACK will be filled in the corresponding position, which is as shown in Table 2 below.

TABLE 2

| DAI count "00" | | DAI count "01" | | DAI count "10" | | DAI count "11" | | DAI count "00" | |
|---|---|---|---|---|---|---|---|---|---|
| Codeword 0 | Codeword 1 | NACK | NACK | Codeword 0 | Codeword 1 | Codeword 0 | Codeword 1 | Codeword 0 | Codeword 1 |

It should be understood that if there is only one codeword in a certain PDSCH, the HARQ-ACK feedback information corresponding to codeword 1 may be NACK.

Multicarrier Scenario

When a base station sends a PDCCH for scheduling a PDSCH to a UE, first counter DAI information included in the PDCCH may include count information 1 and count information 2, wherein the count information 1 is used for indicating the PDSCH currently scheduled by the PDCCH is which one PDSCH is in the HARQ feedback window, and the count information 2 is used for telling the UE how many PDSCHs there are up to now in the HARQ feedback window.

The HARQ feedback window may be understood as a time range, and the count information 1 is used for indicating the PDSCH currently scheduled by the PDCCH is which one PDSCH is in the HARQ feedback window, which may be understood as that the count information 1 is used for indicating which one the PDSCH currently scheduled by the PDCCH is among all PDSCHs in the time range. The count information 2 is used for telling the UE how many PDSCHs there are up to now in the HARQ feedback window, which means that the count information 2 is used for indicating how many PDSCHs there are up to now in the time range.

A ranking mode of the PDSCHs may be based on an order of the detection opportunities of PDCCH, specifically, it may be in an order of frequency domain first and then time domain. In order to reduce the number of bits of the count information 1 and/or the count information 2, a modulo mode may be used for counting. For example, if the number of bits of the count information 1 (or the count information 2) is 3 bits, the value of the count information 1 (or the count information 2) is modulo 8.

Figure 5:
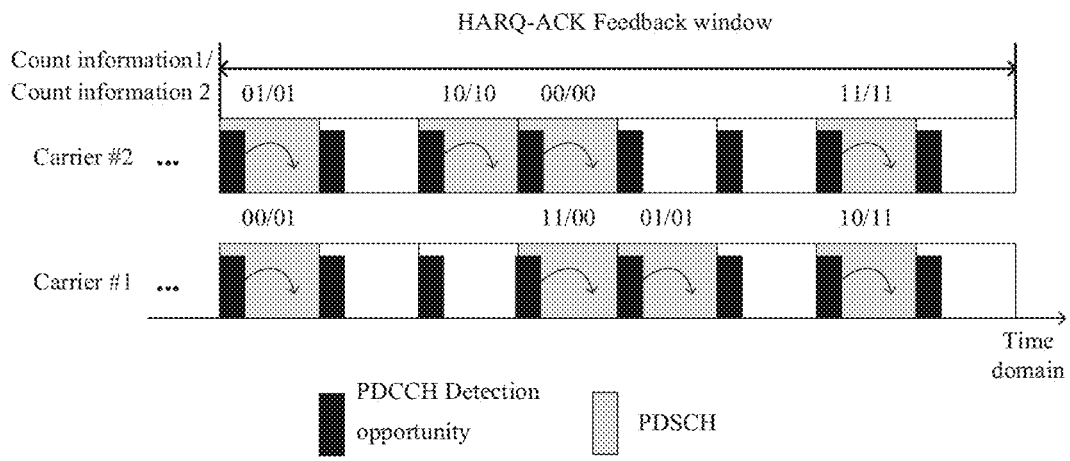
FIG. 5 is a schematic diagram of another HARQ-ACK feedback window according to an implementation of the present application.

As shown in FIG. 5. A UE is configured with 2 carriers, 8 time slots are included in an HARQ-ACK feedback window, and a PDCCH detection opportunity is configured in each time slot of each carrier, so the PDCCH detection opportunities are ranked as a first time slot of carrier #1, a first time slot of carrier #2, a second time slot of carrier #1 and a second time slot of carrier #2 . . . , an eighth time slot of carrier #1 and an eighth time slot of carrier #2. The network device schedules the UE to receive PDSCH on the first, second, sixth, seventh, eighth, ninth, thirteenth and fourteenth time slots among the 16 PDCCH detection opportunities. It is assumed that the count information 1 and count information 2 have 2 bits respectively. Accordingly, the count information 1 and the count information 2 corresponding to PDSCH on these 8 time slots are shown in FIG. 5.

In the example of FIG. 5, it is assumed that each PDSCH corresponds to two codewords. Assuming that the UE has not received the PDSCH in the fourth time slot, the UE may determine the codebook in the HARQ-ACK feedback window as shown in Table 3 below.

TABLE 3

| "00/01" | | "01/01" | | "10/10" | | "11/xx" | |
|---|---|---|---|---|---|---|---|
| Codeword 0 | Codeword 1 | Codeword 0 | Codeword 1 | Codeword 0 | | NACK | NACK |
| "00/xx" | | "01/01" | | "10/11" | | "11/11" | |
| NACK | NACK | Codeword 0 | Codeword 1 | Codeword 0 | Codeword 1 | Codeword 0 | Codeword 1 |

It should be understood that in an implementation of the present application, the PDSCH scheduled by the PDCCH may or may not be in the same time slot as the PDCCH, which is not specifically limited in the present application. Accordingly, the above-mentioned time range or HARQ feedback window may be a window determined according to the same time domain location of uplink resources indicated by DCI (for example, DCI with the same PUCCH time domain location indicated by PDSCH-to-HARQ feedback timing indicator in the DCI or the data channel scheduled by the DCI may be determined as the same HARQ window), and may also be a window where a PDSCH scheduled by the DCI is located, and of course, it may also be a window of the DCI corresponding to these PDSCH.

It should be understood that the codebook of the first feedback sequence in an implementation of the present application may also be a semi-static codebook (which may also be referred to as a static codebook), and the length of the feedback sequence of the semi-static codebook may be preset, for example, it may be preset on a terminal device, determined by the terminal device according to a preset rule, configured by the network side, or determined based on the length of the feedback window or the time range mentioned above, instead of being determined based on the number of actually sent DCI or data channels scheduled by the DCI.

For feedback of the semi-static codebook, PDSCH transmission opportunities in one HARQ-ACK feedback window are ranked in an order of frequency domain first and then time domain, and an order of the feedback codebooks of the PDSCH is determined according to the ranking. Unlike dynamic feedback, the above DCI count information may not exist in the semi-static codebook, so it is necessary to reserve corresponding HARQ feedback bit groups for all PDSCH transmission opportunities or PDCCH transmission opportunities in the HARQ feedback window. Optionally, a ranking unit for the time domain is 1 time slot.

Optionally, the same PDSCH transmission opportunity or PDCCH transmission opportunity may correspond to multiple different PUCCH transmission resources. Which transmission resource to be used may be indicated by the network device.

It is assumed that HARQ feedback bit groups corresponding to all PDSCH transmissions in the HARQ feedback window in FIG. 4 are fed back on the same PUCCH resource. In the case shown in FIG. 4, a corresponding semi-static codebook is shown in table 4 below.

Accordingly, for the network device side, on the second uplink resource, the network device performs a receiving operation of the second feedback sequence, wherein the second feedback sequence includes the feedback information corresponding to at least one piece of second DCI.

In a scenario of unlicensed spectrum of an implementation of the present application, the receiving operation of the second feedback sequence performed by the network device may include detecting the second feedback sequence, and if the terminal device does not send the second feedback sequence, the network device will not detect the second feedback sequence.

Optionally, in an implementation of the present application, a single piece of second DCI may include second count information, wherein the second count information may include at least one of the following (1) and (2).

(1) count information 1, a ranking of the single piece of second DCI being sent at present or the data channel scheduled by the single piece of the second DCI among the second DCI already sent or the data channels scheduled by the second DCI already sent, wherein the ranking may be based on an order of DCI detection opportunities.

The second DCI already sent may refer to second DCI already sent within a certain range, for example, second DCI whose corresponding feedback information has not been sent. At this time, the second count information may indicate a ranking of the current second DCI in the at least one piece of second DCI, wherein the at least one second DCI may be the second DCI whose corresponding feedback information

TABLE 4

| first PDSCH transmission opportunity | | second PDSCH transmission opportunity | | third PDSCH transmission opportunity | | fourth PDSCH transmission opportunity | |
|---|---|---|---|---|---|---|---|
| Codeword 0 | Codeword 1 | NACK | NACK | Codeword 0 | Codeword 1 | Codeword 0 | Codeword 1 |
| fifth PDSCH transmission opportunity | | sixth PDSCH transmission opportunity | | seventh PDSCH transmission opportunity | | eighth PDSCH transmission opportunity | |
| Codeword 0 | Codeword 1 | NACK | NACK | Codeword 0 | Codeword 1 | NACK | NACK |

Herein, a HARQ-ACK information bit corresponding to a unscheduled PDSCH transmission opportunity is NACK.

The above has explained how to transmit the first feedback sequence corresponding to the first DCI. In an implementation of the application, for the same system, first DCI and second DCI (i.e., transmission resources in DCI for indicating feedback information corresponding to the DCI) may exist at the same time, so how the terminal device needs to send corresponding feedback sequences for the first DCI and the second DCI respectively will be described below.

For the second DCI, the terminal device may perform the sending operation of a second feedback sequence on a second uplink resource, wherein the second feedback sequence includes feedback information corresponding to at least one piece of second DCI, a resource location of the second uplink resource is indicated by the second DCI, and the feedback information corresponding to the second DCI reflects a reception situation of a data channel scheduled by the second DCI or a reception situation of the second DCI.

The implementation of the present application is used in a scenario of unlicensed spectrum. Optionally, the sending operation of the second feedback sequence performed by the terminal device may include an LBT operation performed on the channel. If the LBT operation is successful, the second feedback sequence may be sent, and if the LBT operation is unsuccessful, the second feedback sequence may not be sent.

has not been sent. Or, the second count information indicates the ranking of the data channels corresponding to the current second DCI in at least one data channel scheduled by the second DCI whose corresponding feedback information has not been sent.

Or, the second DCI already sent may be the second DCI within a specific time range, or the data channels scheduled by the sent second DCI may be data channels within a specific time range. At this time, the second count information may indicate the ranking of the current second DCI in all second DCI already sent included within the time range, or may indicate the ranking of the data channel scheduled by the current second DCI in the data channels scheduled within the time range. The time range in an implementation of the present application may also be referred to as an HARQ-ACK feedback window.

Herein, the ranking mentioned above may be based on an order of detection opportunities, specifically, it may be in an order of frequency domain first and then time domain. In a multi-carrier scenario (carrier 1, carrier 2 and carrier 3), a first time unit sends three pieces of DCI on three carriers, and the three pieces of DCI are ranked by 1, 2 and 3. A second time unit sends three pieces of DCI on three carriers, and the three pieces of DCI are ranked by 4, 5 and 6. A third time unit sends three pieces of DCI, and the three pieces of DCI are ranked by 7, 8 and 9. Optionally, the time unit may be one or more symbols, or may be one time slot, or one subframe. Optionally, the time unit may be determined according to the PDCCH detection opportunities determined by the terminal device.

(2) count information 2, the number of the second DCI already sent at present or the number of data channels scheduled by the second DCI already sent at present.

The second DCI already sent may refer to second DCI already sent within a certain range, for example, second DCI whose corresponding feedback information has not been sent. At this time, the second count information may indicate the number of the second DCI whose corresponding feedback information has not been sent (which may also be understood as the number of data channels which have not sent feedback information).

Or, the second DCI already sent may be the second DCI within a specific time range, or the data channels scheduled by the second DCI already sent may be data channels within a specific time range.

At this time, the second count information may indicate how many pieces of second DCI have been sent in total from a start time unit of the time range to a time unit where the current second DCI is scheduled, or how many data channels have been scheduled in total from the start time unit of the time range to the time unit occupied by the data channel scheduled by the current second DCI.

Optionally, in an implementation of the present application, the number of bits of the second feedback sequence is determined based on the second count information. That is, a codebook of the second feedback sequence may be a dynamic codebook.

Or, the number of bits of the second feedback sequence is a preset value, that is, a codebook of the second feedback sequence may be a semi-static codebook.

Optionally, in an implementation of the present application, the codebook of the feedback information corresponding to the first DCI and the codebook of the feedback information corresponding to the second DCI are independently configured.

Specifically, the network device may configure the codebook of each of the first DCI and the second DCI respectively as a dynamic codebook or a semi-static codebook, so that the terminal device may send the feedback sequences of the first DCI and the second DCI according to the codebooks configured by the network device for the first DCI and the second DCI respectively.

Or, the network device may configure a codebook for one of the two types of DCI, for example, the codebook of the second DCI is configured as a semi-static codebook or a dynamic codebook, while the codebook of the first DCI may be preset as a dynamic codebook.

Or, the network device may configure the codebooks of feedback information corresponding to the first DCI and the second DCI using one configuration parameter. For example, the network device uses PDSCH-HARQ-ACK-Codebook to configure the codebook. When PDSCH-HARQ-ACK-Codebook=dynamic, the codebooks of the feedback information corresponding to the first DCI and the second DCI are both dynamic codebooks. When PDSCH-HARQ-ACK-Codebook=semi-static, the codebooks of the feedback information corresponding to the first DCI and the second DCI are both semi-static codebooks.

Of course, the codebooks of the first DCI and the second DCI may be both preset.

Optionally, in an implementation of the present application, the codebook of the feedback information corresponding to the first DCI is a dynamic codebook, and the codebook of the feedback information corresponding to the second DCI is a dynamic codebook or a semi-static codebook. For example, the DCI may include two information fields. In the second DCI, a first information field of the two information fields is used for indicating a time domain location of an available PUCCH resource, and a second information field is used for determining the available PUCCH resource from a PUCCH resource set configured by a higher layer. In the first DCI, the first information field of the two information fields is used for indicating that the time domain location of the available PUCCH resource is temporarily undetermined, and the second information field is used for indicating the first count information corresponding to the first DCI. That is to say, for the first DCI, dynamic codebook feedback may be supported without increasing extra signaling or only increasing small signaling overhead, so that codebook overhead may be reduced.

Of course, the codebook of the feedback information corresponding to the first DCI may also be a dynamic codebook, and the codebook of the feedback information corresponding to the second DCI is a dynamic codebook or a semi-static codebook.

The following description takes an example in which the codebook of the first feedback sequence and the codebook of the second feedback sequence are both dynamic codebooks.

Figure 6:
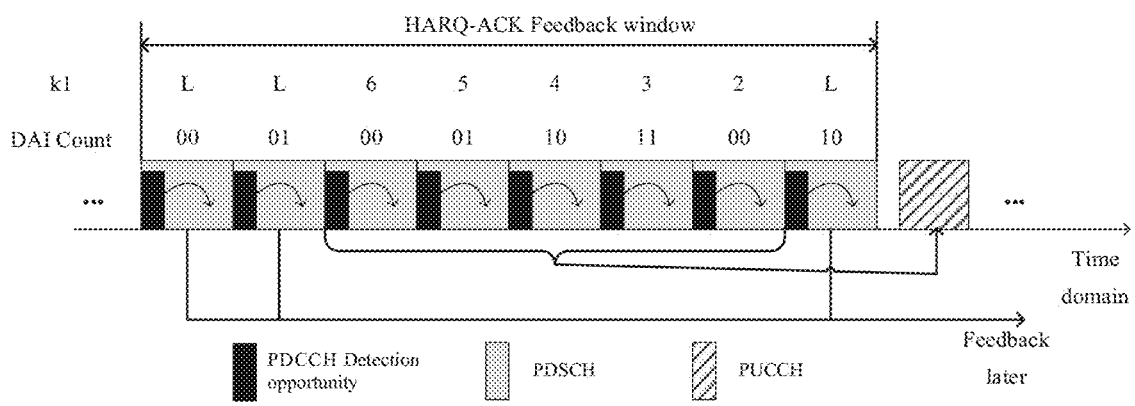
FIG. 6 is a schematic diagram of another HARQ-ACK feedback window according to an implementation of the present application.

As shown in FIG. 6, a network device transmits eight PDSCHs to a terminal device in one HARQ-ACK feedback window, wherein HARQ timing indication information of the first, second and eighth PDSCHs among the eight PDSCHs (e.g., PDSCH-to-HARQ_feedback timing indicator in DCI, that is, k1) indicates that their corresponding HARQ-ACK information is that the feedback resources are to be determined later, which are indicated by "L" in the figure for convenience of understanding. For the third, fourth, fifth, sixth and seventh PDSCHs, HARQ feedback may be determined to be performed on the same PUCCH resource according to the HARQ timing indication information thereof. Therefore, when transmitting the eight PDSCHs, the network device may number DAI counting sequence of PDSCHs with their HARQ timing indication information being L, for example, the DAI count information corresponding to the $1^{st}$, $2^{nd}$ and $8^{th}$ PDSCH is 00, 01 and 10 respectively. The network device may number DAI counting sequence of PDSCHs whose HARQ timing indication information is valid PUCCH resource indication information, for example, DAI count information corresponding to the $3^{rd}$, $4^{th}$, $5^{th}$, $6^{th}$ and $7^{th}$ PDSCH is 00, 01, 10, 11 and 00 respectively. After receiving the eight PDSCHs, the terminal device determines the ranking order of the corresponding codebooks according to the HARQ timing indication information.

In the example of FIG. 6, it is assumed that each PDSCH corresponds to two codewords. For a PDSCH whose HARQ timing indication information is valid PUCCH resource indication information (that is, a PDSCH scheduled by the second DCI in an implementation of the present application), the terminal device may determine codebook 1, which may be shown in table 5 below.

TABLE 5

| HARQ timing indication information is valid | | | | | | | | | |
|---|---|---|---|---|---|---|---|---|---|
| "00" | | "01" | | "10" | | "11" | | "00" | |
| Codeword 0 | Codeword 1 | Codeword 0 | Codeword 1 | Codeword 0 | Codeword 1 | Codeword 0 | Codeword 1 | Codeword 0 | Codeword 1 |

For a PDSCH whose HARQ timing indication information is subsequent feedback (that is, a PDSCH scheduled by the first DCI in an implementation of the present application), the terminal device may determine codebook 2, which may be shown in table 6 below.

TABLE 6

| HARQ timing indication information is feedback later | | | | | |
|---|---|---|---|---|---|
| "00" | | "01" | | "10" | |
| Codeword 0 | Codeword 1 | Codeword 0 | Codeword 1 | Codeword 0 | Codeword 1 |

Optionally, in an implementation of the present application, the at least one piece of second DCI and the at least one piece of first DCI respectively correspond to feedback positions in the first feedback sequence, herein, the feedback position in the first feedback sequence corresponding to the at least one piece of second DCI is filled with placeholder bits, for example, the placeholder bits may be NACK.

Optionally, a position of feedback information corresponding to a single piece of the first DCI in the first feedback sequence is determined based on the following: a ranking of the single piece of the first DCI in a DCI set, wherein the DCI set includes the at least one piece of second DCI and the at least one piece of first DCI; or a ranking of a data channel scheduled by the single piece of the first DCI in the data channel set, wherein the data channel set includes data channels scheduled by the at least one piece of second DCI and data channels scheduled by the at least one piece of first DCI.

Similarly, the at least one piece of second DCI and the at least one piece of first DCI respectively correspond to feedback positions in the second feedback sequence. A feedback position in the second feedback sequence corresponding to the at least one piece of first DCI is filled with placeholder bits.

Optionally, in an implementation of the present application, a position of feedback information corresponding to a single piece of the second DCI in the second feedback sequence is determined based on the following: a ranking of the single piece of the second DCI in a DCI set, wherein the DCI set includes the at least one piece of second DCI and the at least one piece of first DCI; or a ranking of a data channel scheduled by the single piece of the second DCI in the data channel set, wherein the data channel set includes data channels scheduled by the at least one piece of second DCI and data channels scheduled by the at least one piece of first DCI.

Figure 7:
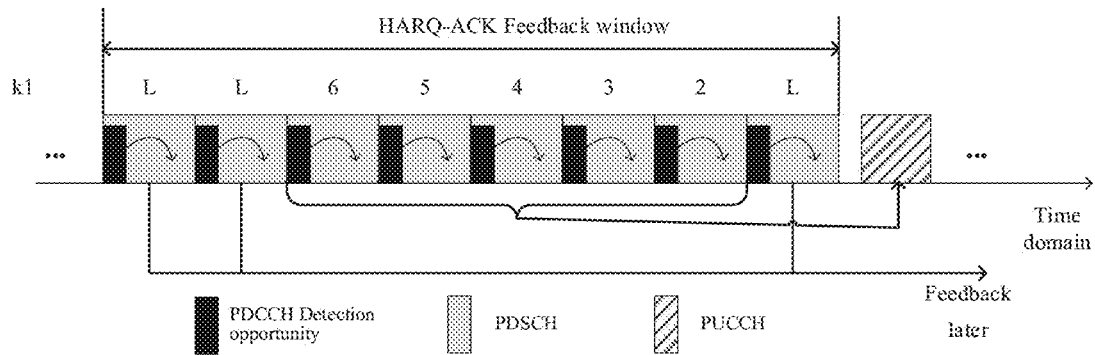
FIG. 7 is a schematic diagram of another HARQ-ACK feedback window according to an implementation of the present application.

For example, taking a semi-static codebook feedback as an example, as shown in FIG. 7, a network device transmits eight PDSCHs to a terminal device in one HARQ-ACK feedback window, wherein HARQ timing indication information (i.e., k1) of the $1^{st}$, $2^{nd}$ and $8^{th}$ PDSCHs among the eight PDSCHs indicates that corresponding HARQ-ACK information thereof is to perform feedback later, which are indicated by "L" in the figure. For the $3^{rd}$, $4^{th}$, $5^{th}$, $6^{th}$ and $7^{th}$ PDSCH, HARQ feedback may be determined to be performed on the same PUCCH resource according to the HARQ timing indication information thereof. As it is a semi-static codebook feedback, according to the fact that there are at most 8 candidate PDSCHs in the HARQ-ACK feedback window, assuming that each PDSCH corresponds to two codewords, the network device may determine that the size of the codebook is 8*2=16 bits.

In the example of FIG. 7, the terminal device may determine a codebook 1 (i.e., the second feedback sequence) for a PDSCH whose HARQ timing indication information is valid PUCCH resource indication information, and a bit position corresponding to the PDSCH whose HARQ timing indication information is invalid PUCCH resource indication information may be filled with a placeholder bit NACK, as shown in table 7 below.

TABLE 7

| codebook corresponding to DCI whose HARQ timing indication information is a valid value | | | | | | | |
|---|---|---|---|---|---|---|---|
| $1^{st}$ PDSCH transmission opportunity | | $2^{nd}$ PDSCH transmission opportunity | | $3^{rd}$ PDSCH transmission opportunity | | $4^{th}$ PDSCH transmission opportunity | |
| NACK | NACK | NACK | NACK | Codeword 0 | Codeword 1 | Codeword 0 | Codeword 1 |
| codebook corresponding to DCI whose HARQ timing indication information is a valid value | | | | | | | |
| $5^{th}$ PDSCH transmission opportunity | | $6^{th}$ PDSCH transmission opportunity | | $7^{th}$ PDSCH transmission opportunity | | $8^{th}$ PDSCH transmission opportunity | |
| Codeword 0 | Codeword 1 | Codeword 0 | Codeword 1 | Codeword 0 | Codeword 1 | NACK | NACK |

The terminal device may determine a codebook 2 (i.e., the first feedback sequence) for a PDSCH whose HARQ timing indication information is to perform feedback later, and a bit position corresponding to the PDSCH whose HARQ timing indication information is valid PUCCH resource indication information may be filled with a placeholder bit NACK, as shown in table 8 below.

TABLE 8

| codebook corresponding to DCI whose HARQ timing indication information is feedback later | | | | | | | |
|---|---|---|---|---|---|---|---|
| 1st PDSCH transmission opportunity | | 2nd PDSCH transmission opportunity | | 3rd PDSCH transmission opportunity | | 4th PDSCH transmission opportunity | |
| Codeword 0 | Codeword 1 | Codeword 0 | Codeword 1 | NACK | NACK | NACK | NACK |
| codebook corresponding to DCI whose HARQ timing indication information is feedback later | | | | | | | |
| 5th PDSCH transmission opportunity | | 6th PDSCH transmission opportunity | | 7th PDSCH transmission opportunity | | 8th PDSCH transmission opportunity | |
| NACK | NACK | NACK | NACK | NACK | NACK | Codeword 0 | Codeword 1 |

It should be understood that in an implementation of the present application, the placeholder bit of the first DCI may be included in the second feedback sequence, but the placeholder bit of the second DCI may not be included in the first feedback sequence.

Specifically, in a case of semi-static codebook configuration, a feedback mode of dynamic codebook is used for a PDSCH whose HARQ timing indication information is to perform feedback later, that is, no matter whether a semi-static codebook feedback or a dynamic codebook feedback is configured by a higher layer, a dynamic feedback is always performed for the PDSCHs whose HARQ timing indication information is to perform feedback later. Herein, the terminal device may determine that codebook 2 (i.e., the first feedback sequence) is as shown in Table 9 below.

TABLE 9

| codebook corresponding to DCI whose HARQ timing indication information is feedback later | | |
|---|---|---|
| "00" | "01" | "10" |
| Codeword 0 | Codeword 1 | Codeword 0 | Codeword 1 | Codeword 0 | Codeword 1 |

It should be understood that the fact that the at least one piece of second DCI and the at least one piece of first DCI respectively correspond to feedback positions in the first feedback sequence (or the second feedback sequence) is illustrated by taking the codebook of the first feedback sequence (or the second feedback sequence) being a semi-static codebook as an example. However, it should be understood that in this case, the codebook of the first feedback sequence (or the second feedback sequence) may also be a dynamic codebook, and at this time, optionally the codebook of the first feedback sequence (or the second feedback sequence) may be determined based on the above first count information and the above second count information. For example, a candidate PDSCH set corresponding to the dynamic codebook includes a PDSCH actually scheduled by the first DCI and a PDSCH actually scheduled by the second DCI. The feedback position corresponding to the first DCI may be located at a high or low position of the first feedback sequence (or the second feedback sequence), and accordingly, the bits of feedback information corresponding to the second DCI may be located at the low or high position of the first feedback sequence (or the second feedback sequence). Or, the bits corresponding to the first DCI and the second DCI in the first feedback sequence (or the second feedback sequence) may be determined according to a detection order of the DCI.

Optionally, in an implementation of the present application, a single piece of the first DCI or a single piece of the second DCI may include third count information, wherein the third count information may include at least one of the following (1) and (2).

(1) count information 1, a ranking of a single piece of the DCI being sent at present or a data channel scheduled by the single piece of the DCI in a DCI set or a data channel set, wherein the ranking is based on an order of detection opportunities. The single piece of DCI includes a single piece of the first DCI or a single piece of the second DCI, the DCI set includes the first DCI already sent and the second DCI already sent, and the data channel set includes data channels scheduled by the first DCI already sent and data channels scheduled by the second DCI already sent.

The first DCI already sent or the second DCI already sent may refer to the first DCI or the second DCI already sent within a certain range, for example, the first DCI or the second DCI whose corresponding feedback information has not been sent. At this time, the third count information may indicate a ranking of the current first DCI or second DCI in the DCI set, wherein the DCI set may be the first DCI and the second DCI whose corresponding feedback information has not been sent. Or, the third count information indicates the ranking of a data channel corresponding to the current first DCI or second DCI in a data channel set, wherein data channels in the data channel set are scheduled by the first DCI or the second DCI whose corresponding feedback information has not been sent.

Or, the first DCI already sent or second DCI may be the first DCI or second DCI within a specific time range, or the data channels scheduled by the first DCI already sent or second DCI already sent may be data channels within a specific time range. At this time, the third count information may indicate a ranking of the current first DCI or second DCI in all already sent first DCI or second DCI included within the time range, or may indicate a ranking of a data channel scheduled by the current first DCI or second DCI in the data channel set scheduled within the time range. The time range in an implementation of the present application may also be referred to as an HARQ-ACK feedback window.

Herein, the ranking mentioned above may be based on an order of detection opportunities, specifically, it may be in the order of frequency domain first and then time domain. In a multi-carrier scenario (carrier 1, carrier 2 and carrier 3), a first time unit sends three pieces of DCI on three carriers, and the three pieces of DCI are ranked by 1, 2 and 3. A second time unit sends three pieces of DCI on three carriers, and the three pieces of DCI are ranked by 4, 5 and 6. A third time unit sends three pieces of DCI, and the three pieces of DCI are ranked by 7, 8 and 9. Optionally, the time unit may be one or more symbols, or may be one time slot, or one subframe. Optionally, the time unit may be determined according to the PDCCH detection opportunities determined by the terminal device.

(2) count information 2, the number of the first DCI and second DCI already sent at present or the number of data channels scheduled by the first DCI and second DCI already sent at present.

The first DCI or the second DCI already sent may refer to first DCI or second DCI already sent within a certain range, for example, first DCI or second DCI whose corresponding feedback information has not been sent. At this time, the third count information may indicate the number of the first DCI and the second DCI whose corresponding feedback information has not been sent (which may also be understood as the number of data channels which have not sent feedback information).

Or, the first DCI or second DCI already sent may be the first DCI or second DCI within a specific time range, or the data channels scheduled by the first DCI or second DCI already sent may be data channels within a specific time range.

At this time, the third count information may indicate how many pieces of the first DCI and the second DCI have been sent in total from a start time unit of the time range to a time unit where the current first DCI or second DCI is scheduled, or how many data channels of the two types of DCI have been scheduled in total from the start time unit of the time range to the time unit occupied by the data channel scheduled by the current first DCI or second DCI. Optionally, in an implementation of the present application, the network device may send a second trigger signaling to the terminal device, wherein the second trigger signaling indicates to resend the feedback information corresponding to the at least one piece of second DCI on a third uplink resource.

Specifically, the uplink resource where the corresponding feedback information is located is indicated in the second DCI, and the terminal device may send the feedback information corresponding to the second DCI on the uplink resource. If the network device does not receive the feedback information (for example, it may be that the network device failed to receive the feedback information or the terminal device failed to send the feedback information due to failure of LBT operation on the unlicensed spectrum for the uplink resource of the feedback information), the second trigger signaling may indicate the third uplink resource for resending the feedback information corresponding to the second DCI.

Optionally, in an implementation of the present application, the second trigger signaling may indicate through second information that the DCI corresponding to the resent feedback information is the at least one piece of second DCI, wherein the second information includes at least one of the following.

(1) Information of the Second Uplink Resource.

Specifically, the network device may carry the information of the second uplink resource in the second trigger signaling, so that indicating the terminal device that the DCI with corresponding feedback information needs to be sent on the third uplink resource is the DCI with corresponding feedback information that originally needs to be sent on the second uplink resource, so that the terminal device may determine to send the feedback information corresponding to the at least one piece of second DCI on the third uplink resource according to the information of the second uplink resource.

(2) Information of Second Group

The second group is a channel group where the at least one piece of second DCI or the data channel scheduled by the at least one piece of second DCI is located, or, the second group is a resource group occupied by the at least one piece of second DCI or the data channel scheduled by the at least one piece of second DCI, or, the second group is the at least one piece of second DCI or a data channel scheduled by the at least one piece of second DCI which indicate the same uplink resource, or the second group is an identifier of the second uplink resource.

Specifically, the network device may carry information of the second group in the second trigger signaling, so as to indicate that at least one piece of second DCI with corresponding feedback information needs to be sent on the third uplink resource, and the second group may be the channel group where the at least one piece of second DCI or the data channel scheduled by the at least one piece of second DCI is located or may be the resource group occupied by the at least one piece of second DCI or the data channel scheduled by the at least one piece of second DCI. Therefore, the terminal device may resend the feedback information corresponding to the at least one piece of second DCI on the third uplink resource based on the second trigger signaling. In this case, the second DCI or the channel group to which its scheduled data channel belongs or the resource group occupied by the second DCI or its scheduled data channel may be carried in the second DCI, so that the second trigger signaling may be associated with the corresponding second DCI.

Optionally, the number of the DCI corresponding to the first uplink resource (i.e., the DCI that needs to send corresponding feedback information on the first uplink resource) may or may not be equal to the number of the DCI corresponding to the third uplink resource (i.e., the DCI that needs to send corresponding feedback information on the third uplink resource). For example, the DCI corresponding to the third uplink resource is a subset of the DCI corresponding to the first uplink resource. For example, the DCI corresponding to the first uplink resource is a subset of the DCI corresponding to the third uplink resource. For example, the DCI corresponding to the first uplink resource partially overlaps with the DCI corresponding to the third uplink resource.

Specifically, in an implementation mode, in addition to the feedback information corresponding to the at least one piece of second DCI needs to be retransmitted on the third uplink resource, the feedback information corresponding to the at least one piece of the first DCI also needs to be transmitted on the third uplink resource. At this time, the third uplink resource mentioned here may be the first uplink resource mentioned above, and the second trigger signaling mentioned here may be the first trigger signaling mentioned above.

Specifically, since the HARQ feedback process occurs in an unauthorized frequency band, the terminal device may need to perform channel detection first when performing PUCCH transmission. For example, if LBT fails before PUCCH 1, the terminal device cannot transmit PUCCH 1. In addition, when the network device receives PUCCH 1, there is a possibility that PUCCH 1 cannot be demodulated correctly. Therefore, if the network device does not receive PUCCH 1 correctly, when sending the trigger signaling of PUCCH 2 (the first uplink resource in an implementation of the present application), group numbers of group 1 (PDSCH scheduled by the first DCI) and group 2 (PDSCH scheduled by the second DCI) may be included in the trigger signaling, and the terminal device feeds back HARQ-ACK information included in group 1 and group 2 on the corresponding PUCCH 2 after receiving the trigger signaling.

Figure 8:
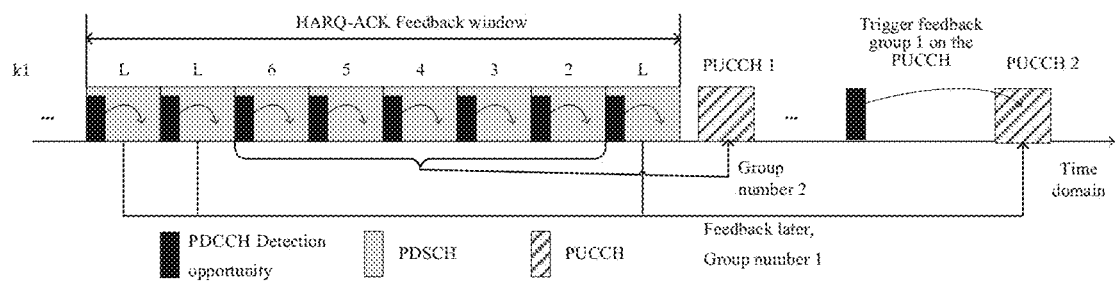
FIG. 8 is a schematic diagram of another HARQ-ACK feedback window and feedback resource according to an implementation of the present application.

For example, as shown in FIG. 8, a group number of HARQ-ACK information (i.e., the aforementioned codebook 2) corresponding to a PDSCH with invalid HARQ timing indication information in a HARQ-ACK feedback window is 1, and a group number of HARQ-ACK information (i.e., the aforementioned codebook 1) corresponding to a PDSCH with valid HARQ timing indication information in a HARQ-ACK feedback window is 2. The network device may send a trigger signaling to the terminal device, wherein the trigger signaling is used for determining a resource that may transmit HARQ-ACK information, such as PUCCH 2. The trigger signaling includes a group number of the HARQ-ACK information, such as group 2 (because the trigger signaling mainly indicates a PUCCH resource for HARQ-ACK information corresponding to a PDSCH whose HARQ timing indication information is invalid, therefore, there is no need to indicate additional information of group 1), or group 1 and group 2 (the network device may also display HARQ-ACK information to be transmitted on the PUCCH resources indicated by the trigger signaling). After receiving the group number, the terminal device feeds back the HARQ-ACK information included in group 1 and group 2 on the corresponding PUCCH 2.

Optionally, in an implementation of the present application of the application, when performing feedback of the HARQ-ACK information, the codebook 1 may be regarded as a group of HARQ-ACK codebooks, and the codebook 2 may be regarded as a group of HARQ-ACK codebooks, herein different groups of codebooks may be numbered according to different characteristics. For example, HARQ-ACK information indicating feedback on the same PUCCH resource may be grouped, or HARQ-ACK information corresponding to PDSCHs with invalid HARQ timing indication information in a time window may be grouped, or HARQ-ACK information corresponding to PDSCHs with valid HARQ timing indication information in a time window may be grouped, etc. When determining a PUCCH resource by signaling trigger, the trigger signaling may include the group number of HARQ-ACK codebooks, so that the terminal device may determine the codebook to be transmitted on the PUCCH resource. Optionally, the time window may be a window determined according to DCI which indicates uplink resources with the same time domain location or data channels scheduled by DCI (for example, DCI with the same PUCCH time domain location indicated by PDSCH-to-HARQ_feedback timing indicator in the DCI or the data channels scheduled by the DCI are determined as the same time window), or the time window may be determined according to a maximum value and/or a minimum value of HARQ timing indication information, or the time window may be indicated by the trigger signaling. Optionally, in an implementation of the present application, the HARQ feedback window and the time window may refer to the same window.

Optionally, in an implementation of the present application, the second trigger signaling is used for indicating a time range of DCI corresponding to feedback information to be sent on the third uplink resource, or the second trigger signaling is used for indicating a time range of a data channel corresponding to feedback information to be sent on the third uplink resource.

The time range indicated by the second trigger signaling includes: a time unit closest to the second trigger signaling and/or a time unit farthest from the second trigger signaling; or, a time unit where a DCI closest to the second trigger signaling is located and/or a time unit where a DCI farthest from the second trigger signaling is located; or, a time unit where a data channel closest to the second trigger signaling is located and/or a time unit where a data channel farthest from the second trigger signaling is located.

Figure 9:
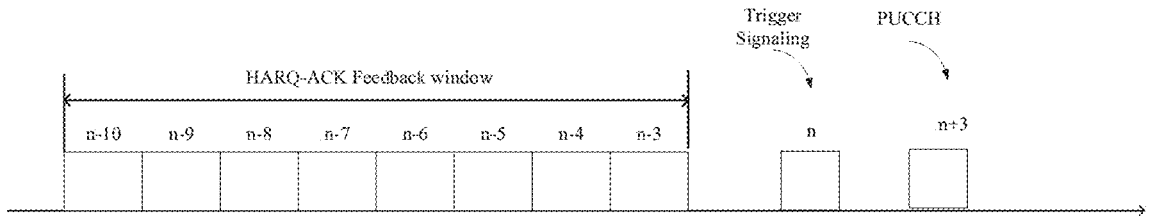
FIG. 9 is a schematic diagram of time sequence relationship of another HARQ-ACK feedback window, trigger signaling and feedback resource according to an implementation of the present application.

For example, as shown in FIG. 9, the second trigger signaling is sent on time slot n, the third uplink resource indicated by the second trigger signaling is time slot n+3, and the indicated time range is time slot n−10 to time slot n−3, that is, feedback information corresponding to at least part of DCI or data channels in time slots n−10 to n−3 needs to be sent on time slot n+3. For example, if the second DCI indicating feedback resources may be grouped as one group (group 2) and first DCI not indicating feedback resources may be grouped as another group (group 1), the feedback information corresponding to DCI in the group 1 and/or the feedback information corresponding to DCI in the group 2 in time slots n−10 to n−3 may be indicated to be sent on this time slot n+3.

Optionally, in an implementation of the present application, a time range corresponding to values of bits indicating a time range in the first trigger signaling or the second trigger signaling may be preset by a higher layer signaling. For example, the farthest time units represented by bits 00, 01, 10 and 11 are 8, 12, 16 and 20 respectively (the numerical value here refers to how many time units the trigger signaling is pushed advance at most), and for the nearest distance, bits 00, 01, 10 and 11 represent that the closest time units are 0, 2, 4 and 6 (the numerical value here refers to how many time units the trigger signaling is pushed advance at least).

Therefore, in an implementation of the present application of the application, the resource location of the uplink resource used for sending feedback information corresponding to the DCI may be acquired in a manner other than acquiring from the first DCI. The information field indicating the resource location in the first DCI may be used for other functions, so that the flexibility of the DCI may be improved, furthermore, the resource location of the uplink resource may be acquired in other manners, so that the flexibility of resource location indication may be further improved.

Figure 10:
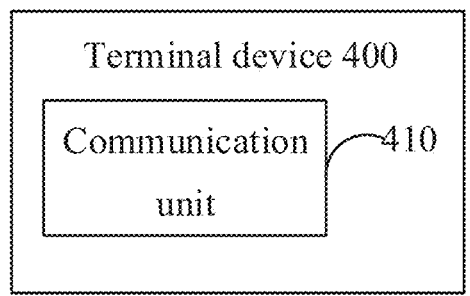
FIG. 10 is a schematic diagram of a terminal device according to an implementation of the present application.

FIG. 10 is a schematic block diagram of a terminal device 400 according to an implementation of the present application. The terminal device 400 includes a communication unit 410.

The communication unit 410 is configured to perform a sending operation of a first feedback sequence on a first uplink resource, wherein the first feedback sequence includes feedback information corresponding to at least one piece of first DCI, the feedback information corresponding to the first DCI reflects a reception situation of a data channel scheduled by the first DCI or a reception situation of the first DCI, and a resource location of the first uplink resource is acquired in a manner other than acquiring from the first DCI.

Optionally, in an implementation of the present application, the resource location of the first uplink resource is indicated by a first trigger signaling other than the first DCI.

Optionally, in an implementation of the present application, the first trigger signaling further includes first information, wherein the first information is used for indicating that the feedback sequence transmitted on the first uplink resource includes feedback information corresponding to the at least one piece of first DCI.

Optionally, in an implementation of the present application, the first information includes: information of a first group; wherein the first group is a channel group where the at least one piece of first DCI or the data channel scheduled by the at least one piece of first DCI is located, or, the first group is a resource group occupied by the at least one piece of first DCI or the data channel scheduled by the at least one piece of first DCI.

Optionally, in an implementation of the present application, the first DCI includes first count information, and the first count information indicates:

a ranking of a single piece of the first DCI being sent at present or a data channel scheduled by the single piece of the first DCI among the already sent first DCI or the data channels scheduled by the first DCI already sent, wherein the ranking may be based on an order of a sending time; and/or, the first DCI includes the first count information, which indicates the number of the first DCI already sent at present or the number of data channels scheduled by the first DCI already sent at present.

Optionally, in an implementation of the present application, the number of bits of the first feedback sequence is determined based on the first count information.

Optionally, in an implementation of the present application, the first count information is carried in a first information field in the first DCI, and the first information field multiplexes a feedback resource indication field.

Optionally, in an implementation of the present application, the number of bits of the first feedback sequence is a preset value.

Optionally, in an implementation of the present application, the communication unit 410 is further configured to: perform a sending operation of a second feedback sequence on a second uplink resource, and the second feedback sequence includes feedback information corresponding to at least one piece of second DCI, a resource location of the second uplink resource is indicated by the second DCI, and the feedback information corresponding to the second DCI reflects a reception situation of a data channel scheduled by the second DCI or a reception situation of the second DCI.

Optionally, in an implementation of the application, a ranking of a single piece of the second DCI being sent at present or a data channel scheduled by the single piece of the second DCI among the second DCI already sent or the data channels scheduled by the second DCI already sent, wherein the ranking may be based on an order of a sending time; and/or, the second DCI includes second count information, which indicates the number of second DCI already sent at present or the number of data channels scheduled by the second DCI already sent at present.

Optionally, in an implementation of the present application, the number of bits of the second feedback sequence is determined based on the second count information.

Optionally, in an implementation of the present application, the number of bits of the second feedback sequence is a preset value.

Optionally, in an implementation of the present application, the at least one piece of second DCI and the at least one piece of first DCI respectively correspond to feedback positions in the second feedback sequence; herein a feedback position in the second feedback sequence corresponding to the at least one piece of first DCI is filled with placeholder bits.

Optionally, in an implementation of the application, a position of feedback information corresponding to a single piece of the second DCI in the second feedback sequence is determined based on the following: a ranking of the single piece of the second DCI in a DCI set, wherein the DCI set includes the at least one piece of second DCI and the at least one piece of first DCI; or a ranking of a data channel scheduled by the single piece of the second DCI in a data channel set, wherein the data channel set includes the data channel scheduled by the at least one piece of second DCI and the data channel scheduled by the at least one piece of first DCI.

Optionally, in an implementation of the present application, the at least one piece of second DCI and the at least one piece of first DCI respectively correspond to feedback positions in the first feedback sequence; herein a feedback position in the first feedback sequence corresponding to the at least one piece of second DCI is filled with a placeholder bit.

Optionally, in an implementation of the application, a position of feedback information corresponding to a single piece of the first DCI in the first feedback sequence is determined based on the following: a ranking of the single piece of the first DCI in a DCI set, wherein the DCI set includes the at least one piece of second DCI and the at least one piece of first DCI; or, a ranking of a data channel scheduled by the single piece of the first DCI in a data channel set, wherein the data channel set includes the data channel scheduled by the at least one piece of second DCI and the data channel scheduled by the at least one piece of first DCI.

Optionally, in an implementation of the present application, the communication unit 410 is further configured to: receive a second trigger signaling, wherein the second trigger signaling indicates to resend the feedback information corresponding to the at least one piece of second DCI on a third uplink resource; and resend the feedback information corresponding to the at least one piece of second DCI on the third uplink resource.

Optionally, in an implementation of the present application, the second trigger signaling may indicate through second information that the DCI corresponding to the resent feedback information is the at least one piece of second DCI, wherein the second information includes: information of the second uplink resource; and/or, information of a second group, herein, the second group is a channel group where the at least one piece of second DCI or the data channel of the at least one piece of second DCI is located, or, the second group is a resource group occupied by the at least one piece of second DCI or the data channel scheduled by the at least one piece of second DCI.

Optionally, in an implementation of the application, the third uplink resource is the first uplink resource, and the second trigger signaling is further used for indicating to send the feedback information corresponding to the at least one piece of first DCI on the third uplink resource.

Optionally, in an implementation of the present application, the second trigger signaling is used for indicating a time range of DCI corresponding to feedback information to be sent on the third uplink resource, or the second trigger signaling is used for indicating a time range of a data channel corresponding to feedback information to be sent on the third uplink resource.

Optionally, in an implementation of the application, the time range indicated by the second trigger signaling includes a time unit where the DCI closest to the first trigger signaling is located and/or a time unit where the DCI farthest from the first trigger signaling is located; or, a time unit where a data channel closest to the second trigger signaling is located and/or a time unit where a data channel farthest from the second trigger signaling is located.

Optionally, in an implementation of the present application, a codebook of the feedback information corresponding to the first DCI and a codebook of the feedback information corresponding to the second DCI are independently configured.

Optionally, in an implementation of the present application, the codebook of the feedback information corresponding to the first DCI is a dynamic codebook, and the codebook of the feedback information corresponding to the second DCI is a dynamic codebook or a semi-static codebook.

Optionally, in an implementation of the present application, the terminal device is applied to an unlicensed spectrum.

It should be understood that the terminal device 400 may implement the corresponding operations implemented by the terminal device in the above method implementations, which will not be repeated here again for brevity.

Figure 11:
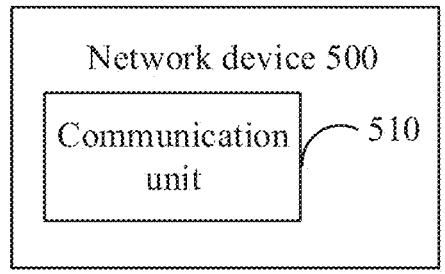
FIG. 11 is a schematic diagram of a network device according to an implementation of the present application.

FIG. 11 is a schematic block diagram of a network device 500 according to a wireless communication method of an implementation of the present application. The network device 500 includes a communication unit 510.

The communication unit 510, configured to perform a receiving operation of a first feedback sequence on a first uplink resource, herein the first feedback sequence includes feedback information corresponding to at least one piece of first DCI, the feedback information corresponding to the first DCI reflects a reception situation of a data channel scheduled by the first DCI or a reception situation of the first DCI, and a resource location of the first uplink resource is acquired in a manner other than acquiring from the first DCI.

Optionally, in an implementation of the present application, the resource location of the first uplink resource is indicated by a first trigger signaling other than the first DCI.

Optionally, in an implementation of the present application, the first trigger signaling further includes first information, wherein the first information is used for indicating that the feedback sequence transmitted on the first uplink resource includes feedback information corresponding to the at least one piece of first DCI.

Optionally, in an implementation of the present application, the first information includes: information of a first group; herein the first group is a channel group where the at least one piece of first DCI or the data channel scheduled by the at least one piece of first DCI is located, or, the first group is a resource group occupied by the at least one piece of first DCI or the data channel scheduled by the at least one piece of first DCI.

Optionally, in an implementation of the present application, the first DCI includes first count information, and the first count information indicates:

a ranking of a single piece of the first DCI being sent at present or a data channel scheduled by the single piece of the first DCI among the first DCI already sent or the data channels scheduled by the first DCI already sent, wherein the ranking may be based on an order of a sending time; and/or, the first DCI includes the first count information, which indicates the number of the first DCI already sent at present or the number of data channels scheduled by the first DCI already sent at present.

Optionally, in an implementation of the present application, the number of bits of the first feedback sequence is determined based on the first count information.

Optionally, in an implementation of the present application, the first count information is carried in a first information field in the first DCI, wherein the first information field multiplexes a feedback resource indication field.

Optionally, in an implementation of the present application, the number of bits of the first feedback sequence is a preset value.

Optionally, in an implementation of the present application, the communication unit 510 is further configured to: perform a receiving operation of a second feedback sequence on a second uplink resource, herein the second feedback sequence includes feedback information corresponding to at least one piece of second DCI, a resource location of the second uplink resource is indicated by the second DCI, and the feedback information corresponding to the second DCI reflects a reception situation of a data channel scheduled by the second DCI or a reception situation of the second DCI.

Optionally, in an implementation of the application, the second DCI includes second count information, which indicates: a ranking of a single piece of the second DCI being sent at present or a data channel scheduled by the single piece of the second DCI among the already sent second DCI or the data channels scheduled by the second DCI already sent, wherein the ranking may be based on an order of a sending time; and/or, the number of the second DCI already sent at present or the number of data channels scheduled by the second DCI already sent at present.

Optionally, in an implementation of the present application, the number of bits of the second feedback sequence is determined based on the second count information.

Optionally, in an implementation of the present application, the number of bits of the second feedback sequence is a preset value.

Optionally, in an implementation of the present application, the at least one piece of second DCI and the at least one piece of first DCI respectively correspond to feedback positions in the second feedback sequence; herein a feedback position in the second feedback sequence corresponding to the at least one piece of first DCI is filled with a placeholder bit.

Optionally, in an implementation of the application, a position of feedback information corresponding to a single piece of the second DCI in the second feedback sequence is determined based on the following: a ranking of the single piece of the second DCI in a DCI set, wherein the DCI set includes the at least one piece of second DCI and the at least one piece of first DCI; or, a ranking of a data channel scheduled by the single piece of the second DCI in a data channel set, wherein the data channel set includes the data channel scheduled by the at least one piece of second DCI and the data channel scheduled by the at least one piece of first DCI.

Optionally, in an implementation of the present application, the at least one piece of second DCI and the at least one piece of first DCI respectively correspond to feedback positions in the first feedback sequence; herein a feedback position in the first feedback sequence corresponding to the at least one piece of second DCI is filled with placeholder bits.

Optionally, in an implementation of the application, a position of feedback information corresponding to a single piece of the first DCI in the first feedback sequence is determined based on the following: a ranking of the single piece of first the DCI in a DCI set, wherein the DCI set includes the at least one piece of second DCI and the at least one piece of first DCI; or, a ranking of a data channel scheduled by the single piece of the first DCI in a data channel set, wherein the data channel set includes the data channel scheduled by the at least one piece of second DCI and the data channel scheduled by the at least one piece of first DCI.

Optionally, in an implementation of the present application, the communication unit 510 is further configured to: send a second trigger signaling, wherein the second trigger signaling indicates to resend the feedback information corresponding to the at least one piece of second DCI on a third uplink resource; and receive the feedback information corresponding to the at least one piece of second DCI on the third uplink resource.

Optionally, in an implementation of the present application, the second trigger signaling may indicate through second information that DCI corresponding to the resent feedback information is the at least one piece of second DCI, wherein the second information includes: information of the second uplink resource; and/or, information of a second group,
   herein the second group is a channel group where the at least one piece of second DCI or the data channel of the at least one piece of second DCI is located, or, the second group is a resource group occupied by the at least one piece of second DCI or the data channel scheduled by the at least one piece of second DCI.

Optionally, in an implementation of the application, the third uplink resource is the first uplink resource, and the second trigger signaling is further used for indicating to send the feedback information corresponding to the at least one piece of first DCI on the third uplink resource.

Optionally, in an implementation of the present application, the second trigger signaling is used for indicating a time range of DCI corresponding to feedback information to be sent on the third uplink resource, or the second trigger signaling is used for indicating a time range of a data channel corresponding to feedback information to be sent on the third uplink resource.

Optionally, in an implementation of the application, the time range indicated by the second trigger signaling includes a time unit where the DCI closest to the first trigger signaling is located and/or a time unit where the DCI farthest from the first trigger signaling is located; or, a time unit where a data channel closest to the second trigger signaling is located and/or a time unit where a data channel farthest from the second trigger signaling is located.

Optionally, in an implementation of the present application, a codebook of the feedback information corresponding to the first DCI and a codebook of the feedback information corresponding to the second DCI are independently configured.

Optionally, in an implementation of the present application, the codebook of the feedback information corresponding to the first DCI is a dynamic codebook, and the codebook of the feedback information corresponding to the second DCI is a dynamic codebook or a semi-static codebook.

Optionally, in an implementation of the present application, the network device is applied to an unlicensed spectrum.

It should be understood that the network device 500 may implement the corresponding operations implemented by the network device in the above method implementations, which will not be repeated here again for brevity.

Figure 12:
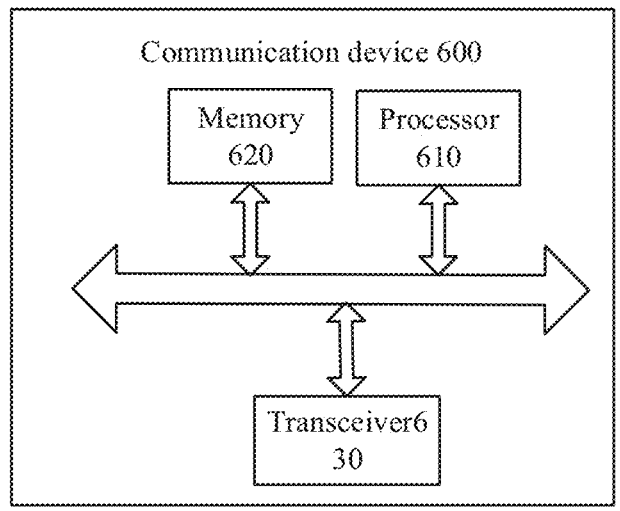
FIG. 12 is a schematic diagram of a communication system according to an implementation of the present application.

FIG. 12 is a schematic structure diagram of a communication device 600 according to an implementation of the present application. The communication device 600 shown in FIG. 12 includes a processor 610. The processor 610 may call and run a computer program from a memory to implement the methods in the implementations of the present application.

Optionally, as shown in FIG. 12, the communication device 600 may further include a memory 620. The processor 610 may call and run a computer program from the memory 620 to implement the methods in the implementations of the present application.

The memory 620 may be a separate device independent of the processor 610 or may be integrated in the processor 610.

Optionally, as shown in FIG. 12, the communication device 600 may further include a transceiver 630, and the processor 610 may control the transceiver 630 to communicate with another device. Specifically, the transceiver 630 may send information or data to other devices or receive information or data sent by another device.

The transceiver 630 may include a transmitter and a receiver. The transceiver 630 may further include antennas, and the number of antennas may be one or more.

Optionally, the communication device 600 may be a network device of an implementation of the present application, and the communication device 600 may implement the corresponding processes implemented by the network device in various methods of the implementations of the present application, which will not be repeated here again for brevity.

Optionally, the communication device 600 may be specifically a mobile terminal/terminal device of an implementation of the present application, and the communication device 600 may implement the corresponding processes implemented by the mobile terminal/terminal device in various methods of the implementations of the present application, which will not be repeated here again for brevity.

Figure 13:
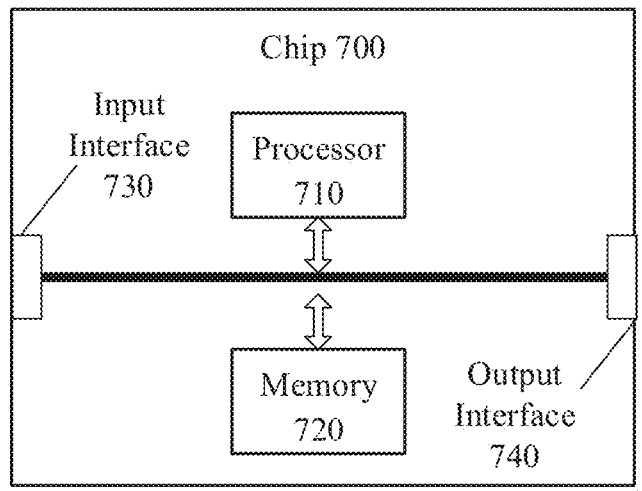
FIG. 13 is a schematic diagram of a chip according to an implementation of the present application.

FIG. 13 is a schematic diagram of structure of a chip according to an implementation of the present application. A chip 700 shown in FIG. 13 includes a processor 710. The processor 710 may call and run a computer program from a memory to implement a method in an implementation of the present application.

Optionally, as shown in FIG. 13, the chip 700 may further include a memory 720. The processor 710 may call and run a computer program from the memory 720 to implement the methods in an implementation of the present application.

The memory 720 may be a separate device independent of the processor 710 or may be integrated in the processor 710.

Optionally, the chip 700 may further include an input interface 730. The processor 710 may control the input interface 730 to communicate with another device or chip. Specifically, the processor 710 may acquire information or data sent by another device or chip.

Optionally, the chip 700 may further include an output interface 740. The processor 710 may control the output interface 740 to communicate with another device or chip. Specifically, the processor 710 may output information or data to another device or chip.

Optionally, the chip may be applied to a network device in an implementation of the present application, and the chip may implement the corresponding processes implemented by the network device in various methods of the implementations of the present application, which will not be repeated here again for brevity.

Optionally, the chip may be applied to a mobile terminal/terminal device of an implementation of the present application, and the chip may implement the corresponding processes implemented by the mobile terminal/terminal device in various methods of implementations of the present application, which will not be repeated here again for brevity.

It should be understood that the chip mentioned in an implementation of the present application may be referred to as a system-level chip, a system chip, a chip system or a system-on-chip, etc.

Figure 14:
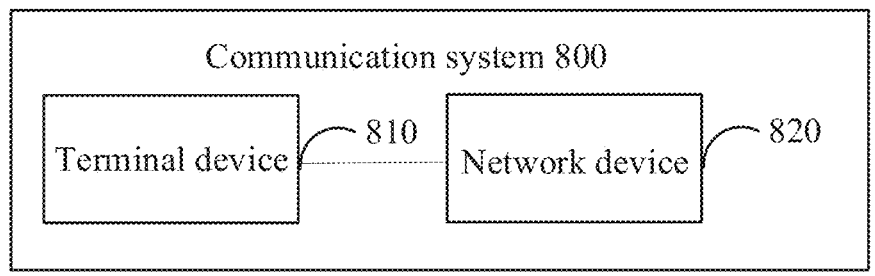
FIG. 14 is a schematic diagram of a communication system according to an implementation of the present application.

FIG. 14 is a schematic block diagram of a communication system 800 according to an implementation of the present application. As shown in FIG. 14, the communication system 800 may include a terminal device 810 and a network device 820.

The terminal device 810 may be configured to implement the corresponding functions implemented by the terminal device in the above-mentioned methods, and the network device 820 may be configured to implement the corresponding functions implemented by the network device in the above-mentioned methods, which will not be repeated here again for brevity.

It should be understood that the processor in an implementation of the present application may be an integrated circuit chip having a signal processing capability. In an implementation process, the acts of the foregoing method implementations may be implemented by using an integrated logic circuit of hardware in the processor or instructions in a form of software. The above processor may be a general purpose processor, a Digital Signal Processor (DSP), an Application Specific Integrated Circuit (ASIC), a Field Programmable Gate Array (FPGA) or another programmable logic device, a discrete gate or a transistor logic device, or a discrete hardware component. The processor may implement or perform methods, acts and logical block diagrams disclosed in an implementation of the present application. The general purpose processor may be a microprocessor, or the processor may also be any conventional processor or the like. The acts of the method disclosed with reference to an implementation of the present application may be directly implemented by a hardware decoding processor, or may be implemented by a combination of hardware and software modules in the decoding processor. The software modules may be located in a memory medium commonly used in the art, such as a random access memory, a flash memory, a read-only memory, a programmable read-only memory or an electrically erasable programmable memory, or a register. The storage medium is located in the memory, and the processor reads the information in the memory and completes the acts of the above method in combination with its hardware.

It may be understood that, the memory in an implementation of the present application may be a volatile memory or a non-volatile memory, or may include both a volatile memory and a non-volatile memory. The non-volatile memory may be a Read-Only Memory (ROM), a Programmable ROM (PROM), an Erasable PROM (EPROM), an Electrically EPROM (EEPROM), or a flash memory. The volatile memory may be a random access memory (Random Access Memory, RAM), which is used as an external cache. As an exemplary but not limitative description, many forms of RAMs may be used, for example, a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM), and a Direct Rambus RAM (DRRAM). It should be noted that the memories in the systems and methods described in this specification are intended to include, but are not limited to, these and any memory of another proper type.

It should be understood that, the foregoing memory is an example for illustration and should not be construed as a limitation. For example, the memory in the implementations of the present application may also be a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM), a Direct Rambus RAM (DRRAM), or the like. That is, memories in the implementations of the present application are intended to include, but are not limited to, these and any other suitable types of memories.

An implementation of the present application further provides a computer readable storage medium configured to store a computer program.

Optionally, the computer readable storage medium may be applied to a network device of the implementation of the present application, and the computer program enables a computer to perform the corresponding processes implemented by the network device in various methods of the implementations of the present application, which will not be repeated here again for brevity.

Optionally, the computer readable storage medium may be applied to a mobile terminal/terminal device in an implementation of the present application, and the computer program enables a computer to perform the corresponding processes implemented by the mobile terminal/terminal device in various methods of the implementations of the present application, which will not be repeated here again for brevity.

An implementation of the present application further provides a computer program product including computer program instructions.

Optionally, the computer program product may be applied to a network device in an implementation of the present application, and the computer program instructions enable a computer to perform the corresponding processes implemented by the network device in various methods of the implementations of the present application, which will not be repeated again here for brevity.

Optionally, the computer program product may be applied to a mobile terminal/terminal device in an implementation of the present application, and the computer program instructions enable a computer to perform the corresponding processes implemented by the mobile terminal/terminal device in various methods of the implementations of the present application, which will not be repeated here again for brevity.

An implementation of the present application further provides a computer program.

Optionally, the computer program may be applied to a network device in an implementation of the present application. When the computer program is run on a computer, the computer is enabled to perform the corresponding processes implemented by the network device in various methods of the implementations of the present application, which will not be repeated here again for brevity.

Optionally, the computer program may be applied to a mobile terminal/terminal device in an implementation of the present application. When the computer program is run on a computer, the computer is enabled to perform the corresponding processes implemented by the mobile terminal/terminal device in various methods of the implementations of the present application, which will not be repeated here again for brevity.

Those of ordinary skill in the art will recognize that the exemplary elements and algorithm acts described in combination with implementations disclosed herein may be implemented in electronic hardware, or a combination of computer software and electronic hardware. Whether these functions are implemented in hardware or software depends on the specific application and design constraints of the technical solution. Those skilled in the art may use different methods to implement the described functions in respect to each particular application, but such implementation should not be considered to be beyond the scope of the present application.

Those skilled in the art may clearly learn that for convenience and conciseness of description, the specific working processes of systems, apparatuses and units described above may refer to the corresponding processes in the method implementations, and this will not be repeated here.

In several implementations provided by the present application, it should be understood that the disclosed systems, apparatuses and methods may be implemented in other ways. For example, the device implementations described above are only illustrative, for example, the division of the units is only a logical function division, and there may be other division manners in actual implementation. For example, multiple units or components may be combined or integrated into another system, or some features may be ignored or not executed. On the other hand, the mutual coupling or direct coupling or communication connection shown or discussed may be indirect coupling or communication connection of apparatuses or units through some interfaces, and may be in electrical, mechanical or other forms.

A unit described as a separate component may or may not be physically separated, and the component shown as a unit may or may not be a physical unit. i.e., it may be located in one place or may be distributed over multiple network units. Some or all of the units may be selected according to actual needs to achieve the purpose of the implementations.

In addition, various functional units in various implementations of the present application may be integrated in one processing unit, or the various units may be physically present separately, or two or more units may be integrated in one unit.

The functions may be stored in a computer readable storage medium if realized in a form of software functional units and sold or used as a separate product. Based on this understanding, the technical solution of the present application, in essence, or the part contributing to the prior art, or the part of the technical solution, may be embodied in the form of a software product stored in a memory medium, including a number of instructions for causing a computer device (which may be a personal computer, a server, or a network device and the like) to perform all or part of the acts of the method described in various implementations of the present application. The aforementioned storage medium includes various media, such as a U disk, a mobile hard disk, a read-only memory (ROM), a random access memory (RAM), a magnetic disk, or an optical disk, which are capable of storing program codes.

What are described above are merely exemplary implementations of the present application, but the protection scope of the present application is not limited thereto. Any variation or substitution that may be easily conceived by a person skilled in the art within the technical scope disclosed by the present application shall be included within the protection scope of the present application. Therefore, the protection scope of the present application shall be subject to the protection scope of the claims.

What is claimed is:

1. A method for wireless communication, comprising:
performing a sending operation of a first feedback sequence on a first uplink resource, wherein:
the first feedback sequence comprises feedback information corresponding to at least one piece of first Downlink Control Information (DCI);
the feedback information corresponding to the first DCI reflects a reception situation of a data channel scheduled by the first DCI or a reception situation of the first DCI, wherein the first DCI comprises timing indication information;
when the timing indication information indicates an invalid feedback resource, a resource location of the first uplink resource is indicated by a second DCI, and
the second DCI includes one information field to indicate a distance between a time slot occupied by the first uplink resource and a time slot occupied by the second DCI; wherein value of bits indicating a time range in the second DCI are preset to a set of time units by a higher layer signal; wherein the feedback information of downlink transmission received within the time range indicated by the value of bits is transmitted on the time slot indicated by the distance;
wherein: the bits comprise a two-bit pair of bits,
the two-bit pair of bits is mapped to a first number of time units representing a closest number of time units by the higher layer signal; and
the two-bit pair of bits is mapped to a second number of time units representing a furthest number of time units by the higher layer signal.

2. The method of claim 1, wherein the second DCI further comprises first information, and the first information is used for indicating that a feedback sequence transmitted on the first uplink resource comprises the feedback information corresponding to the at least one piece of first DCI.

3. The method of claim 2, wherein the first information comprises:
information of a first group;
wherein the first group is a channel group where the data channel scheduled by the at least one piece of first DCI is located.

4. The method of claim 3, wherein both the first DCI and the second DCI comprise a group identifier of the first group.

5. The method of claim 1, wherein the first DCI comprises first count information, and the first count information indicates:
a ranking of a single piece of the first DCI being sent at present or a data channel scheduled by a single piece of the first DCI among the first DCI already sent or data channels scheduled by the first DCI already sent, wherein the ranking is based on an order of DCI detection opportunities or an order of data channel transmission opportunities.

6. The method of claim 5, wherein a number of bits of the first feedback sequence is determined based on the first count information.

7. The method of claim 1, further comprising:
grouping the first DCI into a first group in response to a determination that the timing indication information of the first DCI indicates an invalid feedback resource, wherein a first group identifier corresponds with the first group;
grouping a third DCI into a second group in response to a determination that a timing indication information of the third DCI indicates a valid feedback resource, wherein a second group identifier corresponds with the second group, and wherein the first group identifier and the second group identifier are different;
receiving a trigger signaling indicating the second group identifier; and
sending the third DCI without sending the first DCI in response to receiving the trigger signaling.

8. A method for wireless communication, comprising:
performing a receiving operation of a first feedback sequence on a first uplink resource, wherein:
the first feedback sequence comprises feedback information corresponding to at least one piece of first Downlink Control Information (DCI);
the feedback information corresponding to the first DCI reflects a reception situation of a data channel scheduled by the first DCI or a reception situation of the first DCI, wherein the first DCI comprises timing indication information; and
when the timing indication information indicates an invalid feedback resource, a resource location of the first uplink resource is indicated by a second DCI, and
the second DCI indicates one information field to a distance between a time slot occupied by the first uplink resource and a time slot occupied by the second DCI; wherein value of bits indicating a time range in the second DCI are preset to a set of time units by a higher layer signal; wherein the feedback information of downlink transmission received within the time range indicated by the value of bits is transmitted on the time slot indicated by the distance;
wherein the bits comprise a two-bit pair of bits,
the two-bit pair of bits is mapped to a first number of time units representing a closest number of time units by the higher layer signal; and
the two-bit pair of bits is mapped to a second number of time units representing a furthest number of time units by the higher layer signal.

9. The method of claim 8, wherein the second DCI further comprises first information, and the first information is used for indicating that a feedback sequence transmitted on the first uplink resource comprises feedback information corresponding to the at least one piece of first DCI.

10. The method of claim 9, wherein the first information comprises:
information of a first group;
wherein the first group is a channel group where the data channel scheduled by the at least one piece of first DCI is located.

11. The method of claim 10, wherein both the first DCI and the second DCI comprise a group identifier of the first group.

12. The method of claim 8, wherein the first DCI comprises first count information, and the first count information indicates:
a ranking of a single piece of the first DCI being sent at present or a data channel scheduled by the single piece of the first DCI among the first DCI already sent or data channels scheduled by the first DCI already sent, wherein the ranking is based on an order of DCI detection opportunities or an order of data channel transmission opportunities.

13. The method of claim 12, wherein a number of bits of the first feedback sequence is determined based on the first count information.

14. A terminal device, comprising a memory and a processor, wherein the processor is configured to execute instructions stored in the memory to perform following operation:
performing a sending operation of a first feedback sequence on a first uplink resource, wherein:
the first feedback sequence comprises feedback information corresponding to at least one piece of first Downlink Control Information (DCI);
the feedback information corresponding to the first DCI reflects a reception situation of a data channel scheduled by the first DCI or a reception situation of the first DCI, wherein the first DCI comprise timing indication information;
when the timing indication information indicates an invalid feedback resource, a resource location of the first uplink resource is indicated by a second DCI, and
the second DCI indicates one information field to indicate a distance between a time slot occupied by the first uplink resource and a time slot occupied by the second DCI; wherein value of bits indicating a time range in the second DCI are preset to a set of time units by a higher layer signal; wherein the feedback information of downlink transmission received within the time range indicated by the value of bits is transmitted on the time slot indicated by the distance;
wherein the bits comprise a two-bit pair of bits,
the two-bit pair of bits is mapped to a first number of time units representing a closest number of time units by the higher layer signal; and
the two-bit pair of bits is mapped to a second number of time units representing a furthest number of time units by the higher layer signal.

15. The terminal device of claim 14, wherein the second DCI further comprises first information, and the first information is used for indicating that a feedback sequence transmitted on the first uplink resource comprises feedback information corresponding to the at least one piece of first DCI.

16. The terminal device of claim 15, wherein the first information comprises:
information of a first group;
wherein the first group is a channel group where the data channel scheduled by the at least one piece of first DCI is located.

17. The terminal device of claim 16, wherein both the first DCI and the second DCI comprise a group identifier of the first group.

18. The terminal device of claim 14, wherein the first DCI comprises first count information, and the first count information indicates:
a ranking of a single piece of the first DCI being sent at present or a data channel scheduled by a single piece of the first DCI among the first DCI already sent or data channels scheduled by the first DCI already sent, wherein the ranking is based on an order of DCI detection opportunities or an order of data channel transmission opportunities.

* * * * *